US012700900B2

(12) United States Patent (10) Patent No.: US 12,700,900 B2
Kang et al. (45) Date of Patent: Aug. 4, 2026

(54) METHOD AND DEVICE FOR BEAM REPORTING IN WIRELESS COMMUNICATION SYSTEM

(71) Applicant: LG Electronics Inc., Seoul (KR)

(72) Inventors: Jiwon Kang, Seoul (KR); Suckchel Yang, Seoul (KR); Seonwook Kim, Seoul (KR); Jaehoon Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 446 days.

(21) Appl. No.: 18/245,461

(22) PCT Filed: Sep. 10, 2021

(86) PCT No.: PCT/KR2021/012342
§ 371 (c)(1),
(2) Date: Mar. 15, 2023

(87) PCT Pub. No.: WO2022/060014
PCT Pub. Date: Mar. 24, 2022

(65) Prior Publication Data
US 2023/0344490 A1      Oct. 26, 2023

(30) Foreign Application Priority Data

Sep. 15, 2020    (KR) ......................... 10-2020-0118652

(51) Int. Cl.
*H04B 7/06*         (2006.01)
*H04B 17/318*       (2015.01)
(52) U.S. Cl.
CPC ......... *H04B 7/0626* (2013.01); *H04B 7/0617* (2013.01); *H04B 17/328* (2023.05)
(58) Field of Classification Search
CPC ................ H04B 7/0626; H04B 7/0617; H04B 7/06952; H04B 17/318; H04B 7/0417;
(Continued)

(56) References Cited

U.S. PATENT DOCUMENTS 12,166,547 B2 * 12/2024 Wei ....................... H04B 7/0486
2019/0150013 A1 * 5/2019 Zhang ................... H04W 24/10
375/224
(Continued)

FOREIGN PATENT DOCUMENTS

WO        2018/232090        12/2018
WO      WO-2020144624 A1 * 7/2020

OTHER PUBLICATIONS

Ericcson, "Enhancements to multi-beam operation," R1-2005842, 3GPP TSG-RAN WG1 Meeting #102-e, e-Meeting, Aug. 17-28, 2020, 15 pages.
(Continued)

*Primary Examiner* — Schquita D Goodwin
(74) *Attorney, Agent, or Firm* — Fish & Richardson P.C.

(57) ABSTRACT
Disclosed are a method and a device for beam reporting in a wireless communication system. A method for performing beam reporting by a terminal in a wireless communication system according to an embodiment of the present disclosure may comprise the steps of: receiving configuration information regarding multiple reference signal (RS) resource groups from a base station; and on the basis of the configuration information, transmitting, to the base station, beam report information including one or more of non-event-based first measurement information regarding a first RS resource group and event-based second measurement information regarding a second RS resource group, wherein the first measurement information is periodically, semi-persistently, or aperiodically transmitted, the second measurement information is transmitted on the basis that a predetermined event is triggered in the terminal, and the first measurement information and the second measurement information are layer 1 (L1) measurement information.

17 Claims, 14 Drawing Sheets

(a)

(b)

(58) Field of Classification Search
　　CPC ....... H04B 17/328; H04L 5/00; H04L 5/0051;
　　　　　　H04W 16/28; H04W 24/10; H04W 36/00;
　　　　　　H04W 24/08; H04W 36/00837; H04W
　　　　　　36/0085; H04W 72/1268; H04W 72/21;
　　　　　　　　　　　　　　　　　H04W 72/23
　　See application file for complete search history.

(56) References Cited

U.S. PATENT DOCUMENTS

| | | | |
|---|---|---|---|
| 2020/0220608 A1 | 7/2020 | Venugopal et al. | |
| 2021/0360460 A1* | 11/2021 | Taherzadeh Boroujeni | ................ H04B 7/0632 |
| 2021/0409086 A1* | 12/2021 | Yerramalli | ........... H04W 72/23 |
| 2022/0174601 A1* | 6/2022 | Chen | .................... H04B 7/0413 |
| 2023/0079437 A1* | 3/2023 | Ashraf | ................ H04B 17/318 370/252 |
| 2024/0243822 A1* | 7/2024 | Ma | ........................ H04B 17/345 |
| 2025/0358807 A1* | 11/2025 | Cirik | ..................... H04L 5/0023 |

OTHER PUBLICATIONS

Vivo, "Discussion on multi-beam enhancement," R1-2005363, 3GPP TSG RAN WG1 #102-e, e-Meeting, Aug. 17-28, 2020, 22 pages.

Nokia et al., "Enhancements on Multi-beam Operation," R1-2006843, 3GPP TSG RAN WG1 #102-e, e-Meeting, Aug. 17-28, 2020, 18 pages.

Ericsson, "On remaining details of CSI reporting," 3GPP TSG RAN WG1 Meeting 90bis, Prague, Czech Republic, R1-1718432, Oct. 2017, 13 pages.

Office Action in Korean Appln. No. 10-2023-7007411, mailed on Dec. 17, 2025, 15 pages (with English translation).

* cited by examiner

METHOD AND DEVICE FOR BEAM REPORTING IN WIRELESS COMMUNICATION SYSTEM

CROSS-REFERENCE TO RELATED APPLICATIONS

This application is a National Stage application under 35 U.S.C. § 371 of International Application No. PCT/KR2021/012342, filed on Sep. 10, 2021, which claims the benefit of Korean Application No. 10-2020-0118652, filed on Sep. 15, 2020. The disclosures of the prior applications are incorporated by reference in their entirety.

TECHNICAL FIELD

The present disclosure relates to a wireless communication system, and in more detail, relates to a method and a device for beam reporting in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical problem of the present disclosure is to provide a method and a device for beam reporting which supports improved mobility in a wireless communication system.

An additional technical problem of the present disclosure is to provide a method and a device for high-speed event-based beam reporting in a wireless communication system.

An additional technical problem of the present disclosure is to provide a method and a device for beam reporting which minimizes resource use and signaling in a wireless communication system.

The technical objects to be achieved by the present disclosure are not limited to the above-described technical objects, and other technical objects which are not described herein will be clearly understood by those skilled in the pertinent art from the following description.

A method of performing beam reporting by a terminal in a wireless communication system according to an aspect of the present disclosure may include receiving from a base station configuration information on a plurality of reference signal (RS) resource groups; and transmitting to the base station beam reporting information including at least one of non-event-based first measurement information on a first RS resource group or event-based second measurement information on a second RS resource group based on the configuration information, and the first measurement information may be transmitted periodically, semi-persistently or aperiodically, the second measurement information may be transmitted on a basis that a predetermined event is triggered in the terminal and the first measurement information and the second measurement information may be L1 (layer 1) measurement information.

A method of receiving beam reporting by a base station in a wireless communication system according to an additional aspect of the present disclosure may include transmitting to a terminal configuration information on a plurality of reference signal (RS) resource groups; and receiving beam reporting information including at least one of non-event-based first measurement information on a first RS resource group or event-based second measurement information on a second RS resource group transmitted from the terminal based on the configuration information, and the first measurement information may be transmitted periodically, semi-persistently or aperiodically, the second measurement information may be transmitted on a basis that a predetermined event is triggered in the terminal and the first measurement information and the second measurement information may be L1 (layer 1) measurement information.

According to the present disclosure, a method and a device for beam reporting which supports improved mobility in a wireless communication system may be provided.

According to the present disclosure, a method and a device for high-speed event-based beam reporting in a wireless communication system may be provided.

According to the present disclosure, a method and a device for beam reporting which minimizes resource use and signaling in a wireless communication system may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

FIG. 12 is a diagram which illustrates resource allocation in a time and frequency domain related to a downlink beam management operation in a wireless communication system to which the present disclosure may be applied.

DETAILED DESCRIPTION

Figure 1:
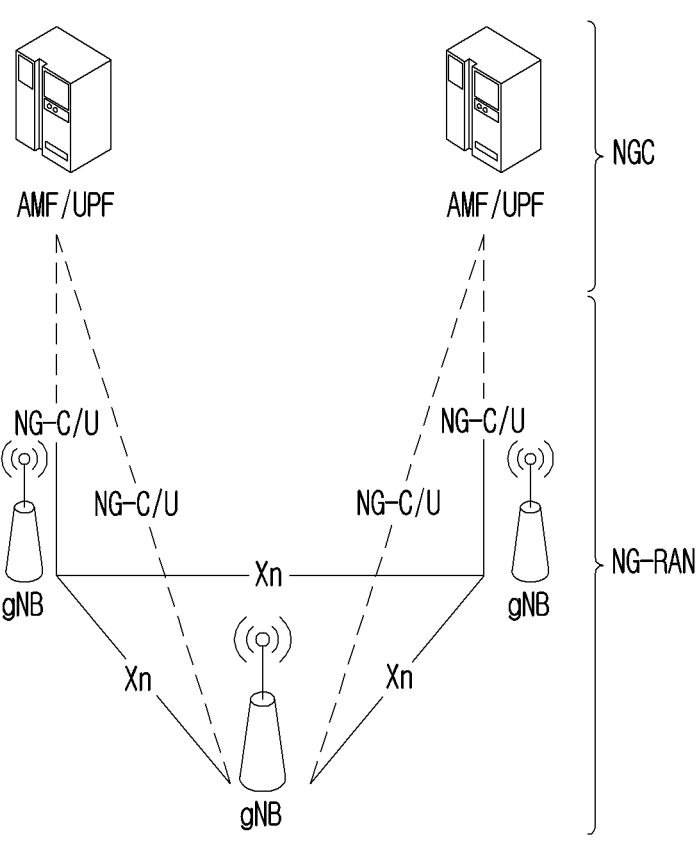
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/ LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power
Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
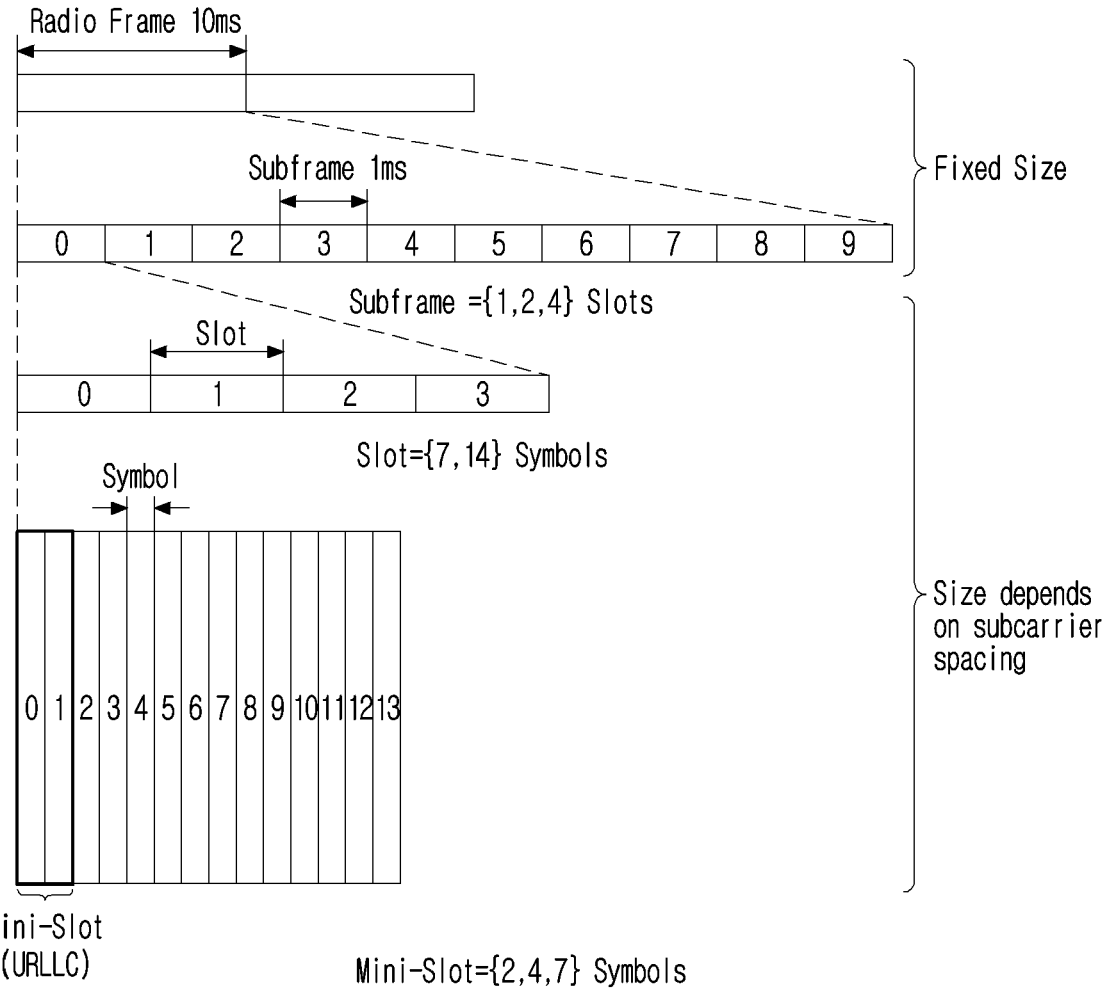
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, $\mu$). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c = 1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f = 1/(\Delta f_{max} N_f/100) T_c = 10$ ms. Here, a radio frame is configured with 10 subframes having a duration of $T_{sf} = (\Delta f_{max} N_f/1000) \cdot T_c = 1$ ms, respectively. In this case, there may be one set of frames for an uplink and one set of frames for a downlink. In addition, transmission in an uplink frame No. i from a terminal should start earlier by $T_{TA} = (N_{TA} + N_{TA,offset}) T_c$ than a corresponding downlink frame in a corresponding terminal starts. For a subcarrier spacing configuration $\mu$, slots are numbered in an increasing order of $n_s^\mu \in \{0, \ldots, N_{slot}^{subframe,\mu} - 1\}$ in a subframe and are numbered in an increasing order of $n_{s,f}^\mu \in \{0, \ldots, N_{slot}^{frame,\mu} - 1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on $\mu=2$ (SCS is 60 kHz), 1 subframe may include 4 slots referring to Table 3. 1 subframe=$\{1,2,4\}$ slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
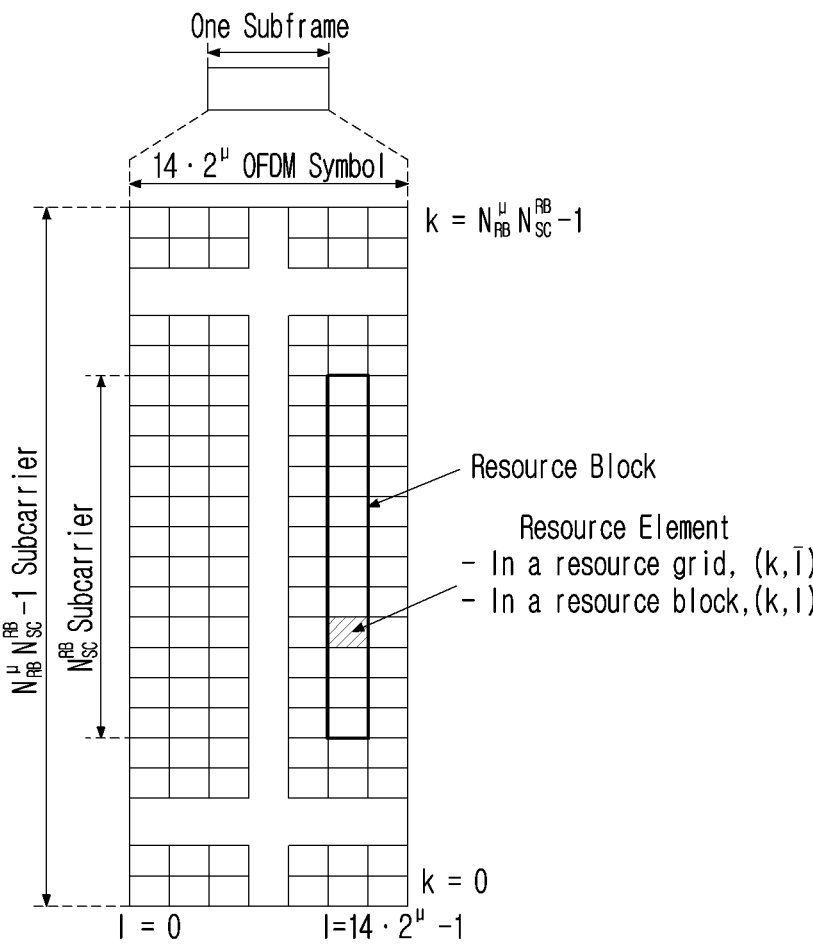
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per 11 and antenna port p. Each element of a resource grid for $\mu$ and an antenna port p is referred to as a resource element and is uniquely identified by an index pair (k,l'). Here, k=0, . . . , $N_{RB}^\mu N_{sc}^{RB} - 1$ is an index in a frequency domain and l'=0, . . . , $2^\mu N_{symb}^{(\mu)} - 1$ refers to a position of a symbol in a subframe. When referring to a resource element in a slot, an index pair (k,l) is used. Here, l=0, . . . , $N_{sym}^\mu - 1$. A resource element (k,l') for $\mu$ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}$=12 consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \qquad \text{[Equation 2]}$$

$N_{BWP,i}^{start,\mu}$ is a common resource block that a BWP starts relatively to common resource block 0.

Figure 4:
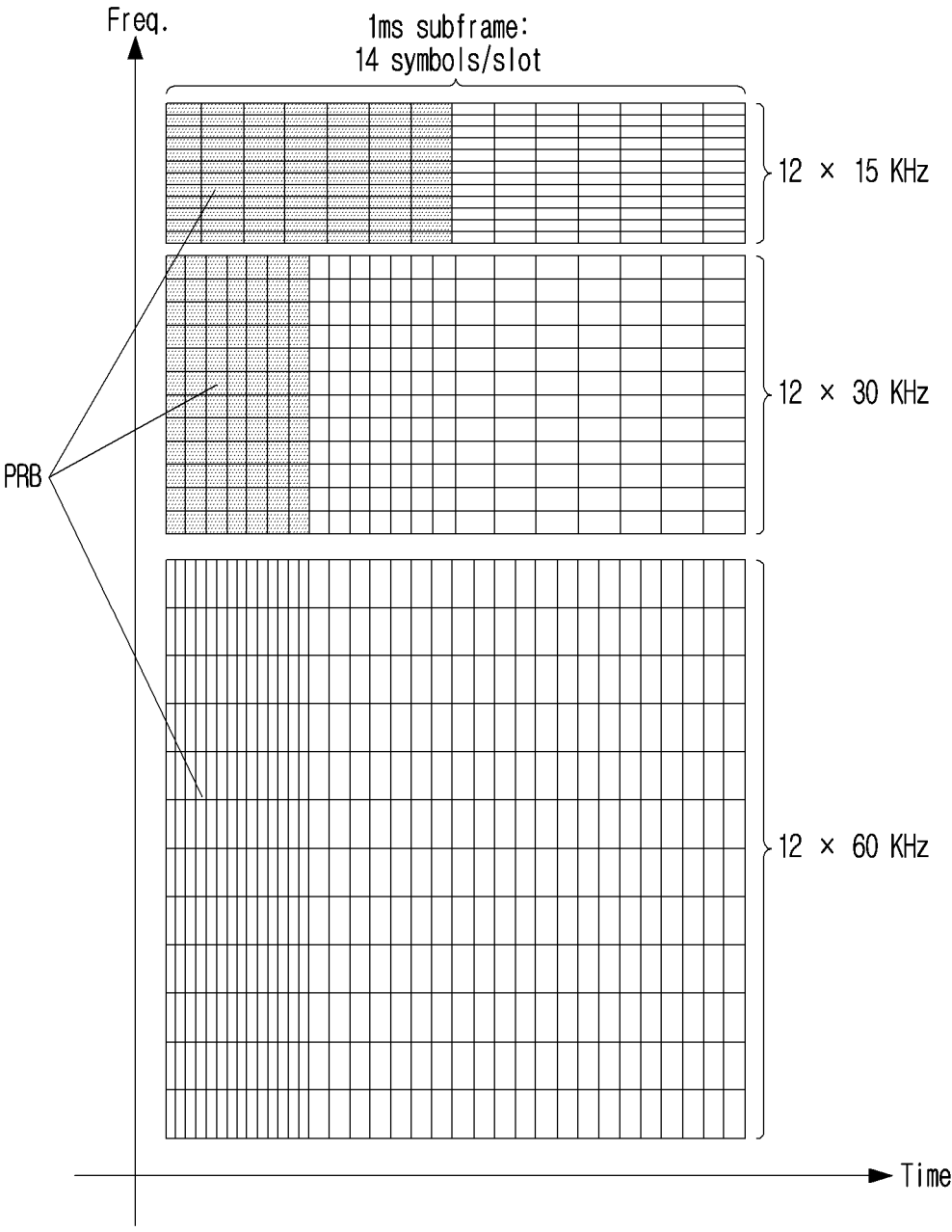
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
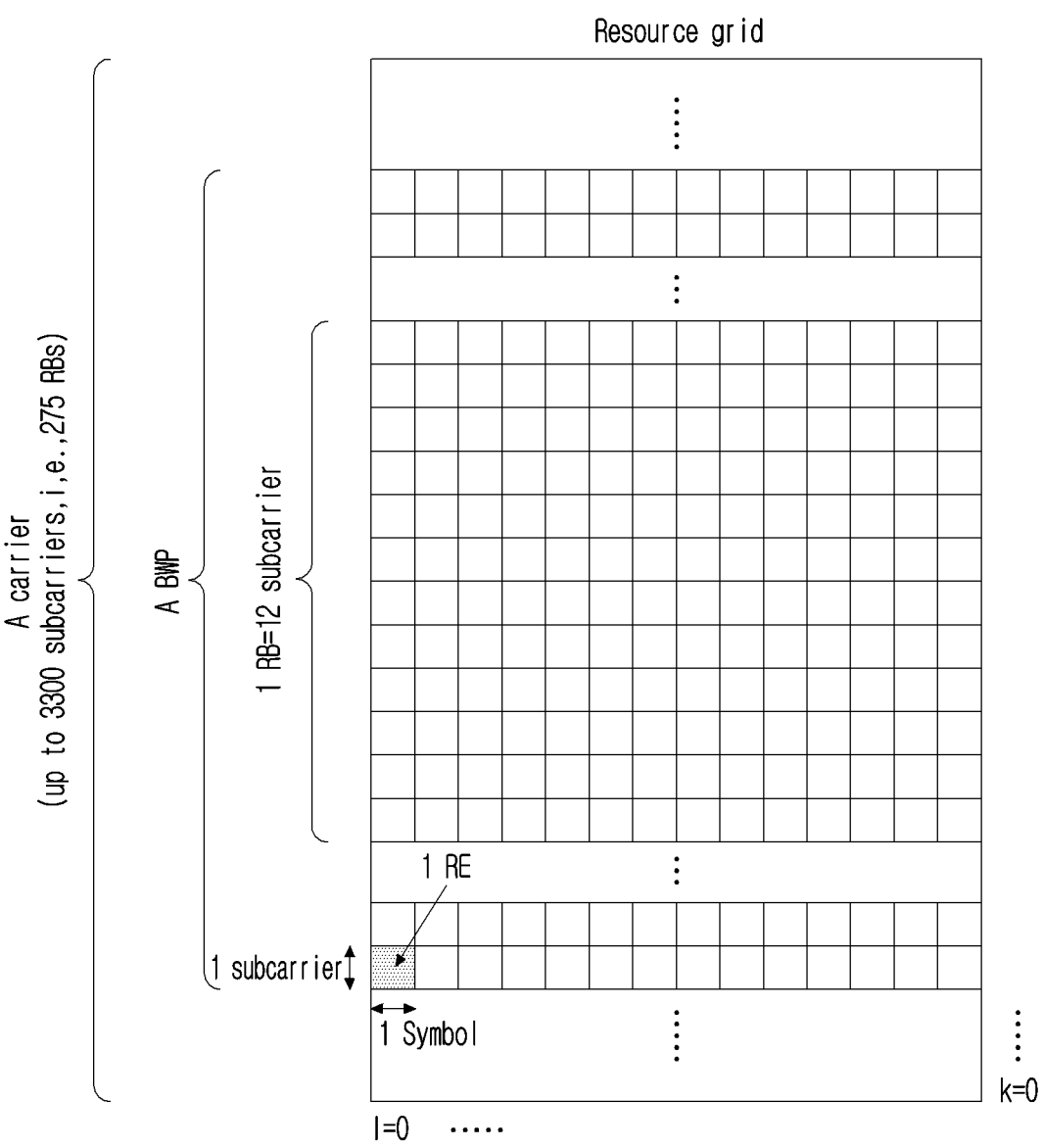
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
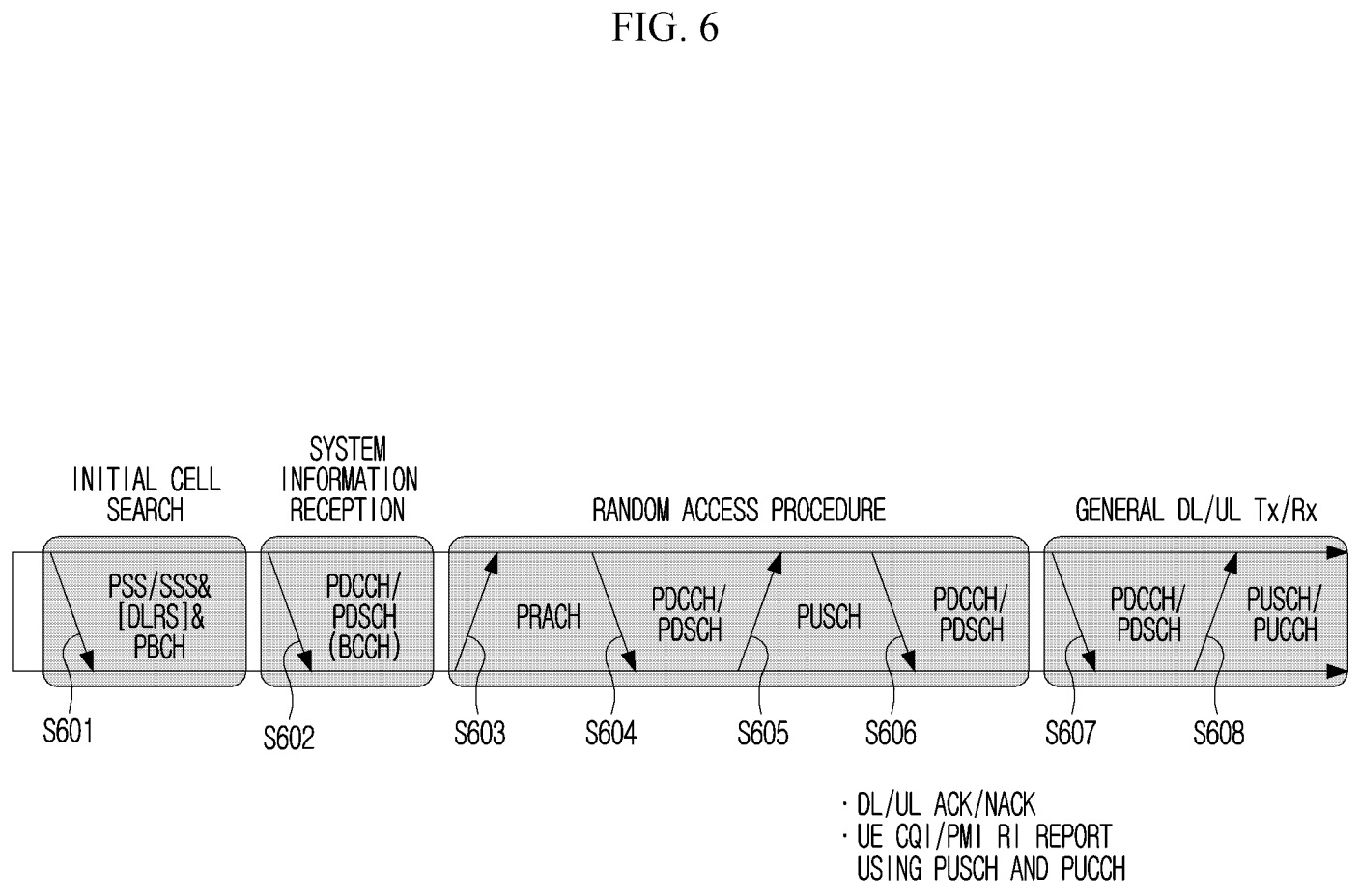

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check)

scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Beam Management (BM)

A BM procedure is L1 (layer 1)/L2 (layer 2) procedures to obtain and maintain a set of beams of a base station (e.g., a gNB, a TRP, etc.) and/or terminal (e.g., a UE) beams which may be used for downlink (DL) and uplink (UL) transmission/reception, it may include the following procedures and terms.

Beam measurement: An operation that a base station or a UE measures a property of a received beamformed signal Beam determination: An operation that a base station or a UE selects its Tx beam/Rx beam Beam sweeping: An operation that a spatial region is covered by using a Tx and/or Rx beam for a certain time interval in a pre-determined method Beam report: An operation that a UE reports information of a beamformed signal based on beam measurement A BM procedure may be classified into (1) a DL BM procedure using a SS (synchronization signal)/PBCH (physical broadcast channel) Block or a CSI-RS and (2) an UL BM procedure using an SRS (sounding reference signal).

In addition, each BM procedure may include Tx beam sweeping for determining a Tx Beam and Rx beam sweeping for determining a Rx beam.

Hereinafter, a DL BM procedure will be described.

A DL BM procedure may include (1) transmission of beamformed DL RSs (reference signals) of a base station (e.g., a CSI-RS or a SS Block (SSB)) and (2) beam reporting of a terminal.

Here, beam reporting may include preferred DL RS ID (identifier)(s) and corresponding L1-RSRP (Reference Signal Received Power).

The DL RS ID may be a SSBRI (SSB Resource Indicator) or a CRI (CSI-RS Resource Indicator).

Hereinafter, a DL BM procedure using an SSB will be described.

Figure 7:
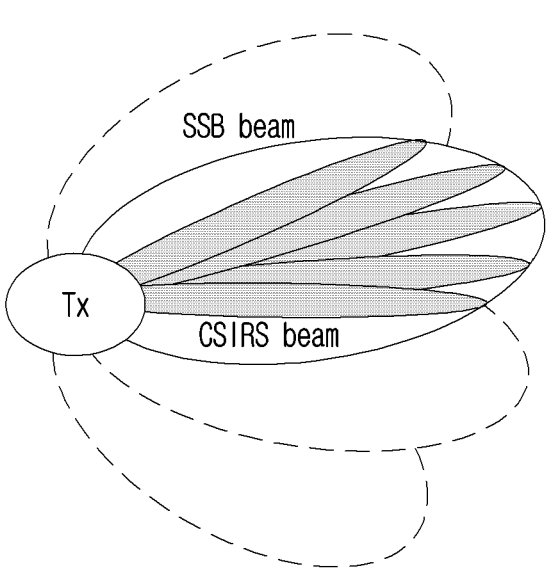
FIG. 7 is a diagram which illustrates a downlink beam management operation in a wireless communication system to which the present disclosure may be applied.

FIG. 7 is a diagram which illustrates a downlink beam management operation in a wireless communication system to which the present disclosure may be applied.

In reference to FIG. 7, an SSB beam and a CSI-RS beam may be used for beam measurement. A measurement metric is L1-RSRP per resource/block. An SSB may be used for coarse beam measurement and a CSI-RS may be used for fine beam measurement. An SSB may be used for both of Tx beam sweeping and Rx beam sweeping.

Rx beam sweeping using an SSB may be performed while an UE changes an Rx beam for the same SSBRI across a plurality of SSB bursts. In this case, one SS burst includes one or more SSBs and one SS burst set includes one or more SSB bursts.

Figure 8:
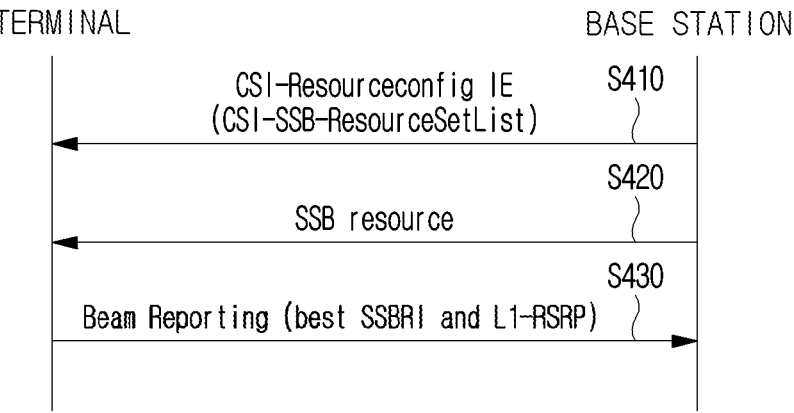
FIG. 8 is a diagram which illustrates a downlink beam management procedure using SSB in a wireless communication system to which the present disclosure may be applied.

FIG. 8 is a diagram which illustrates a downlink beam management procedure using SSB in a wireless communication system to which the present disclosure may be applied.

A configuration on a beam report using an SSB is performed in a CSI/beam configuration in a RRC connected state (or a RRC connected mode).

In reference to FIG. 8, a terminal receives CSI-ResourceConfig IE including CSI-SSB-ResourceSetList including SSB resources used for BM from a base station (S410).

Table 6 represents an example of CSI-ResourceConfig IE and as in Table 6, a BM configuration using an SSB configures an SSB like a CSI-RS resource without being separately defined.

an SSB resource from the base station based on the CSI-SSB-ResourceSetList (S420).

When CSI-RS reportConfig related to a report on a SSBRI and L1-RSRP is configured, the terminal performs (beam) reporting of the best SSBRI and corresponding L1-RSRP to a base station (S430).

Hereinafter, a DL BM procedure using a CSI-RS will be described.

Describing a usage of a CSI-RS, i) a repetition parameter is configured for a specific CSI-RS resource set and when TRS_info is not configured, a CSI-RS is used for beam management. ii) when a repetition parameter is not configured and TRS_info is configured, a CSI-RS is used for a TRS (tracking reference signal). iii) when a repetition parameter is not configured and TRS_info is not configured, a CSI-RS is used for CSI acquisition.

Such a repetition parameter may be configured only for CSI-RS resource sets associated with CSI-ReportConfig having a report of L1 RSRP or 'No Report (or None)'.

If a terminal is configured with CSI-ReportConfig in which reportQuantity is configured as 'cri-RSRP' or 'none' and CSI-ResourceConfig for channel measurement (a higher layer parameter resourcesForChannelMeasurement) does not include a higher layer parameter 'trs-Info' and includes NZP-CSI-RS-ResourceSet in which a higher layer parameter 'repetition' is configured, the terminal may be configured only with a same number of port (1-port or 2-port) having a higher layer parameter 'nrofPorts' for all CSI-RS resources in NZP-CSI-RS-ResourceSet.

When (a higher layer parameter) repetition is configured as 'ON', it is related to a Rx beam sweeping procedure of a terminal. In this case, when a terminal is configured with NZP-CSI-RS-ResourceSet, the terminal may assume that at least one CSI-RS resource in NZP-CSI-RS-ResourceSet is transmitted with the same downlink spatial domain transmission filter. In other words, at least one CSI-RS resource in NZP-CSI-RS-ResourceSet is transmitted through the

TABLE 6

```
-- ASN1START
-- TAG-CSI-RESOURCECONFIG-START
CSI-ResourceConfig ::=              SEQUENCE {
    csi-ResourceConfigId            CSI-ResourceConfigId,
    csi-RS-ResourceSetList          CHOICE {
        nzp-CSI-RS-SSB                 SEQUENCE {
            nzp-CSI-RS-ResourceSetList      SEQUENCE (SIZE
(1..maxNrofNZP-CSI-RS-ResourceSetsPerConfig)) OF NZP-CSI-RS-ResourceSetId
OPTIONAL,
            csi-SSB-ResourceSetList         SEQUENCE (SIZE
(1..maxNrofCSI-SSB-ResourceSetsPerConfig)) OF CSI-SSB-ResourceSetId
    OPTIONAL
        },
    csi-IM-ResourceSetList          SEQUENCE (SIZE (1..maxNrofCSI-IM-
ResourceSetsPerConfig)) OF CSI-IM-ResourceSetId
    },
    bwp-Id                          BWP-Id,
    resource Type                   ENUMERATED { aperiodic, semiPersistent,
periodic },
    ...
}
-- TAG-CSI-RESOURCECONFIGTOADDMOD-STOP
-- ASN1STOP
```

In Table 6, a csi-SSB-ResourceSetList parameter represents a list of SSB resources used for beam management and reporting in one resource set. Here, an SSB resource set may be configured as {SSBx1, SSBx2, SSBx3, SSBx4, . . . }. An SSB index may be defined from 0 to 63. A terminal receives same Tx beam. Here, at least one CSI-RS resource in NZP-CSI-RS-ResourceSet may be transmitted in a different OFDM symbol. In addition, a terminal does not expect to receive a different periodicity in periodicityAndOffset in all CSI-RS resources in NZP-CSI-RS-Resourceset.

Meanwhile, when repetition is configured as 'OFF', it is related to a Tx beam sweeping procedure of a base station. In this case, when repetition is configured as 'OFF', a terminal does not assume that at least one CSI-RS resource in NZP-CSI-RS-ResourceSet is transmitted in the same downlink spatial domain transmission filter. In other words, at least one CSI-RS resource in NZP-CSI-RS-ResourceSet is transmitted through a different Tx beam.

In other words, when reportQuantity of the CSI-RS reportConfig IE is configured as 'ssb-Index-RSRP', a terminal reports the best SSBRI and corresponding L1-RSRP to a base station.

In addition, when a CSI-RS resource may be configured in the same OFDM symbol(s) as an SSB (SS/PBCH Block) and 'QCL-TypeD' is applicable, the terminal may assume that a CSI-RS and an SSB are quasi co-located with regard to 'QCL-TypeD'.

Here, the QCL TypeD may mean that antenna ports are quasi-colocated with regard to a spatial Rx parameter. When a terminal receives a plurality of DL antenna ports in a QCL Type D relationship, it is allowed to apply the same Rx beam. In addition, a terminal does not expect that a CSI-RS will be configured in a RE overlapped with a RE of an SSB.

Figure 9:
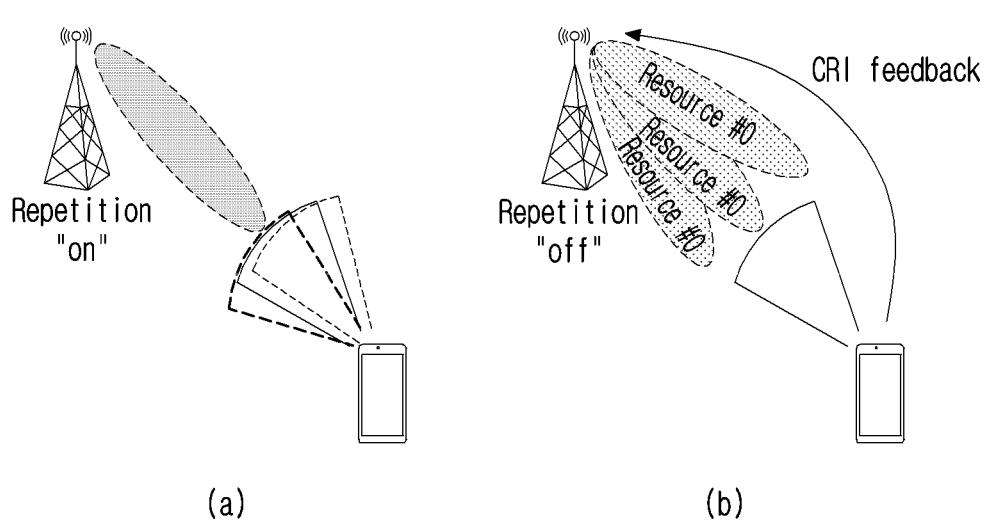
FIG. 9 is a diagram which illustrates a downlink beam management operation using CSI-RS in a wireless communication system to which the present disclosure may be applied.

FIG. 9 is a diagram which illustrates a downlink beam management operation using CSI-RS in a wireless communication system to which the present disclosure may be applied.

FIG. 9(a) represents a Rx beam determination (or refinement) procedure of a terminal and FIG. 9(b) represents a Tx beam sweeping procedure of a base station. In addition, FIG. 9(a) is a case when a repetition parameter is configured as 'ON' and FIG. 9(b) is a case when a repetition parameter is configured as 'OFF'.

Figure 10:
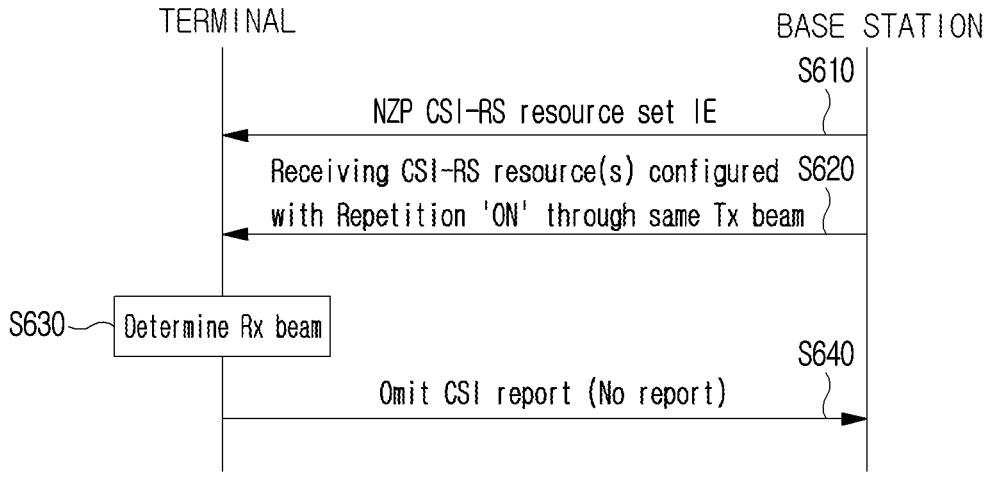
FIG. 10 is a diagram which illustrates an Rx beam determination process of a terminal in a wireless communication system to which the present disclosure may be applied.

FIG. 10 is a diagram which illustrates an Rx beam determination process of a terminal in a wireless communication system to which the present disclosure may be applied.

In reference to FIG. 9(a) and FIG. 10, an Rx beam determination process of a terminal is described.

A terminal receives NZP CSI-RS resource set IE including a higher layer parameter repetition through RRC signaling from a base station (S610). Here, the repetition parameter is configured as 'ON'.

A terminal repetitively receives resources in a CSI-RS resource set configured as repetition 'ON' through the same Tx beam (or DL spatial domain transmission filter) of a base station in a different OFDM symbol (S620).

A terminal determines its Rx beam (S630).

A terminal omits a CSI report (S640). In this case, reportQuantity of a CSI report configuration may be configured as 'No report (or None)'.

In other words, the terminal may omit a CSI report when it is configured as repetition 'ON'.

Figure 11:
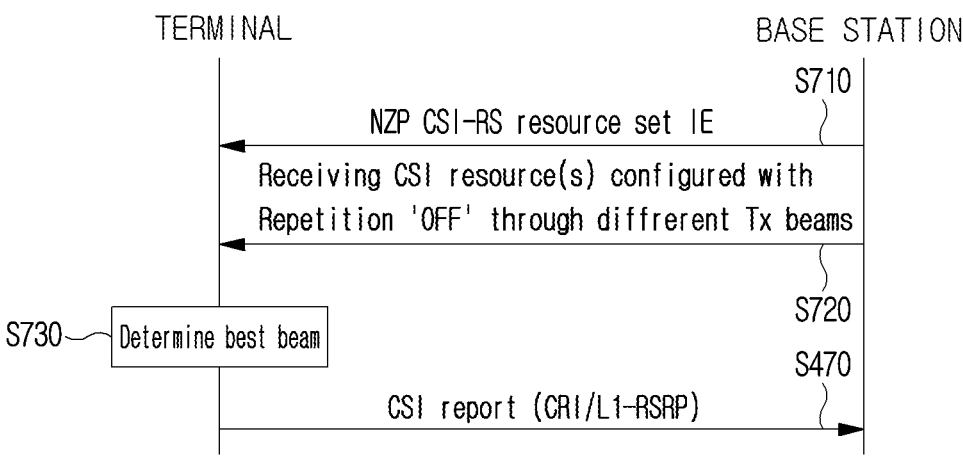
FIG. 11 is a diagram which illustrates a Tx beam determination process of a base station in a wireless communication system to which the present disclosure may be applied.

FIG. 11 is a diagram which illustrates a Tx beam determination process of a base station in a wireless communication system to which the present disclosure may be applied.

In reference to FIG. 9(b) and FIG. 11, a Tx beam determination process of a base station is described.

A terminal receives NZP CSI-RS resource set IE including a higher layer parameter repetition through RRC signaling from a base station (S710). Here, the repetition parameter is configured as 'OFF' and it is related to a Tx beam sweeping procedure of a base station.

A terminal receives resources in a CSI-RS resource set configured as repetition 'OFF' through a different Tx beam (or DL spatial domain transmission filter) of a base station (S720).

A terminal selects (or determines) the best beam (S740).

A terminal reports an ID and related quality information (e.g., L1-RSRP) of a selected beam to a base station (S740). In this case, reportQuantity of a CSI report configuration may be configured as 'CRI+L1-RSRP'.

In other words, when a CSI-RS is transmitted for BM, the terminal reports a CRI and a related L1-RSRP.

Figure 12:
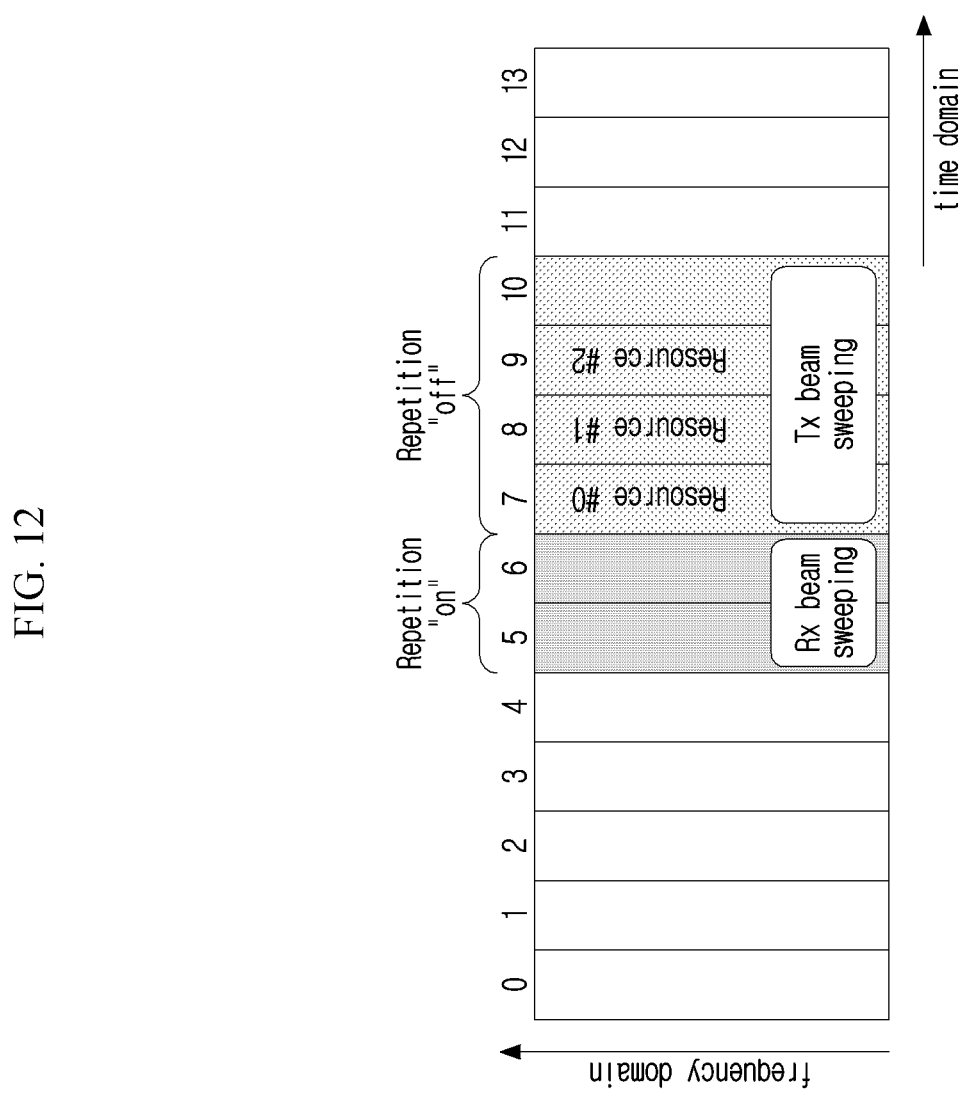

FIG. 12 is a diagram which illustrates resource allocation in a time and frequency domain related to a downlink beam management operation in a wireless communication system to which the present disclosure may be applied.

In reference to FIG. 12, it is shown that when repetition 'ON' is configured in a CSI-RS resource set, a plurality of CSI-RS resources are repetitively used by applying the same Tx beam and when repetition 'OFF' is configured in a CSI-RS resource set, different CSI-RS resources are transmitted in a different Tx beam.

Hereinafter, a beam indication method related to downlink BM will be described.

A terminal may be configured by RRC with a list of a maximum M candidate transmission configuration indication (TCI) states at least for a purpose of a QCL (Quasi Co-location) indication. Here, M may be 64.

Each TCI state may be configured as one RS set. Each ID of a DL RS at least for a spatial QCL purpose (QCL Type D) in a RS set may refer to one of DL RS types such as an SSB, a P (periodic)-CSI RS, an SP (semi-persistent)-CSI RS, an A (aperiodic)-CSI RS, etc.

An ID of DL RS(s) in a RS set used at least for a purpose of a spatial QCL may be initialized/updated at least by explicit signaling.

Table 7 illustrates a TCI-State information element (IE).

A TCI-State IE is associated with a quasi co-location (QCL) type corresponding to one or two DL reference signals (RS).

TABLE 7

```
-- ASN1START
-- TAG-TCI-STATE-START
TCI-State ::=          SEQUENCE {
  tci-StateId           TCI-StateId,
  qcl-Type1             QCL-Info,
  qcl-Type2             QCL-Info
                        OPTIONAL, -- Need R
  ...
}
QCL-Info ::=           SEQUENCE {
  cell                    ServCellIndex
                        OPTIONAL, -- Need R
  bwp-Id                  BWP-Id
                        OPTIONAL, -- Cond CSI-RS-Indicated
  referenceSignal       CHOICE {
    csi-rs                  NZP-CSI-RS-ResourceId,
    ssb                     SSB-Index
  },
  qcl-Type              ENUMERATED {typeA, typeB, typeC, typeD},
  ...
}
-- TAG-TCI-STATE-STOP
-- ASN1STOP
```

In Table 7, a bwp-Id parameter represents a DL BWP (bandwidth part) where an RS is located, a cell parameter represents a carrier where a RS is located and a reference signal parameter represents reference antenna port(s) which is a source of a quasi co-location for corresponding target antenna port(s) or a reference signal including it. The target antenna port(s) may be a CSI-RS, a PDCCH DMRS, or a PDSCH DMRS. In an example, a corresponding TCI state ID (identifier) may be indicated in NZP CSI-RS resource configuration information to indicate QCL reference RS information for a NZP (non-zero power) CSI-RS. In another example, a TCI state ID may be indicated to each CORESET configuration to indicate QCL reference information for PDCCH DMRS antenna port(s). In another example, a TCI state ID may be indicated through DCI to indicate QCL reference information for PDSCH DMRS antenna port(s).

Hereinafter, uplink beam management will be described.

For UL BM, beam reciprocity (or beam correspondence) between a Tx beam and a Rx beam may be valid or may not be valid according to terminal implementation. If reciprocity between a Tx beam and a Rx beam is valid both in a base station and a terminal, a UL beam pair may be matched by a DL beam pair. But, when reciprocity between a Tx beam and a Rx beam is not valid in any one of a base station and a terminal, a process for determining a UL beam pair is required separately from a DL beam pair determination.

In addition, although both of a base station and a terminal maintain beam correspondence, a base station may use a UL BM procedure for determining a DL Tx beam without requesting a terminal to report a preferred beam.

UL BM may be performed through beamformed UL SRS transmission and whether UL BM of an SRS resource set is applied may be configured by a (higher layer parameter) usage. When a usage is configured as 'BeamManagement (BM)', only one SRS resource may be transmitted in each of a plurality of SRS resource sets in a given time instant.

A terminal may be configured with one or more SRS (Sounding Reference Symbol) resource sets configured by (a higher layer parameter) SRS-ResourceSet (through higher layer signaling, RRC signaling, etc.) For each SRS resource set, a UE may be configured with K≥1 SRS resources (a higher layer parameter SRS-resource). Here, K is a natural number and the maximum number of K is indicated by SRS_capability.

Like DL BM, an UL BM procedure may be also classified into Tx beam sweeping of a terminal and Rx beam sweeping of a base station.

Figure 13:
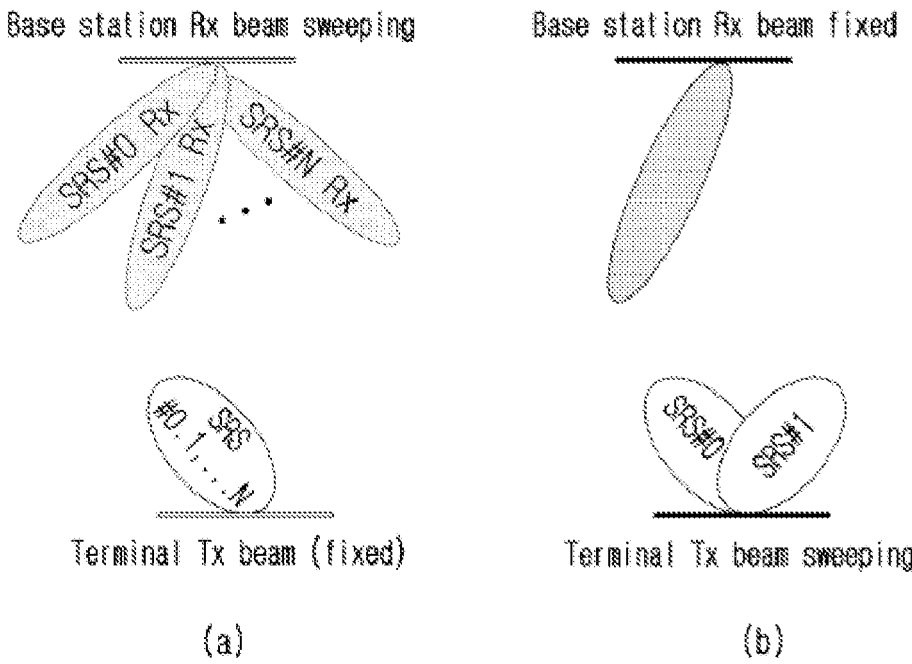
FIG. 13 is a diagram which illustrates an uplink beam management operation using SRS in a wireless communication system to which the present disclosure may be applied.

FIG. 13 is a diagram which illustrates an uplink beam management operation using SRS in a wireless communication system to which the present disclosure may be applied.

FIG. 13(a) illustrates a Rx beam determination operation of a base station and FIG. 13(b) illustrates a Tx beam sweeping operation of a terminal.

Figure 14:
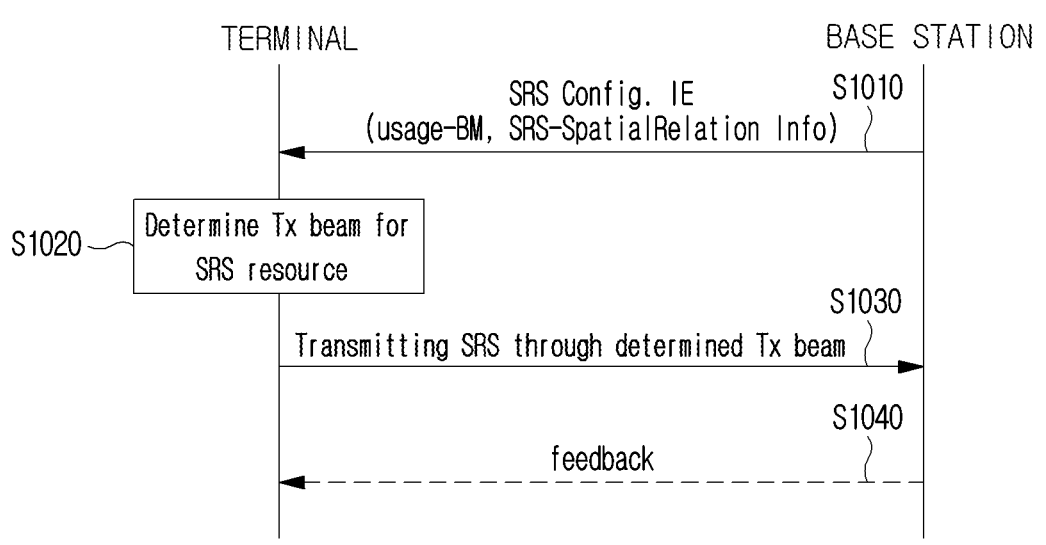
FIG. 14 is a diagram which illustrates an uplink beam management procedure in a wireless communication system to which the present disclosure may be applied.

FIG. 14 is a diagram which illustrates an uplink beam management procedure in a wireless communication system to which the present disclosure may be applied.

A terminal receives RRC signaling (e.g., an SRS-Config IE) including a (higher layer parameter) usage parameter configured as 'beam management' from a base station (S1010).

Table 8 represents an example of an SRS-Config IE (Information Element) and an SRS-Config IE is used for SRS transmission configuration. An SRS-Config IE includes a list of SRS-Resources and a list of SRS-ResourceSets. Each SRS resource set means a set of SRS-resources.

A network may trigger transmission of an SRS resource set by using configured aperiodicSRS-ResourceTrigger (L1 DCI).

TABLE 8

```
-- ASN1START
-- TAG-MAC-CELL-GROUP-CONFIG-START
SRS-Config ::=                                    SEQUENCE {
    srs-ResourceSetToReleaseList                  SEQUENCE (SIZE(1..maxNrofSRS-
ResourceSets)) OF SRS-ResourceSetId                   OPTIONAL, -- Need N
    srs-ResourceSetToAddModList                       SEQUENCE (SIZE(1..maxNrofSRS-
ResourceSets)) OF SRS-ResourceSet                     OPTIONAL, -- Need N
    srs-ResourceToReleaseList                         SEQUENCE (SIZE(1..maxNrofSRS-
Resources)) OF SRS-ResourceId                         OPTIONAL, -- Need N
    srs-ResourceToAddModList                          SEQUENCE (SIZE(1..maxNrofSRS-
Resources)) OF SRS-Resource                       OPTIONAL, -- Need N
    tpc-Accumulation                              ENUMERATED {disabled}
                                                      OPTIONAL, -- Need S ...
}
SRS-ResourceSet ::=                               SEQUENCE {
    srs-ResourceSetId                                 SRS-ResourceSetId,
    srs-ResourceIdList                                SEQUENCE (SIZE(1..maxNrofSRS-
ResourcesPerSet)) OF SRS-ResourceId               OPTIONAL, -- Cond Setup
    resourceType                                      CHOICE {
        aperiodic                                         SEQUENCE {
            aperiodicSRS-ResourceTrigger                      INTEGER (1..maxNrofSRS-
TriggerStates-1),
            csi-RS                                            NZP-CSI-RS-ResourceId
                                                  OPTIONAL, -- Cond NonCodebook
            slotOffset                                        INTEGER (1..32)
                                                      OPTIONAL, -- Need S ...
    },
    semi-persistent                                   SEQUENCE {
        associatedCSI-RS                                  NZP-CSI-RS-ResourceId
                                                  OPTIONAL, -- Cond NonCodebook

...
    },
```

TABLE 8-continued

| | |
|---|---|
| periodic | SEQUENCE { |
| associatedCSI-RS | NZP-CSI-RS-ResourceId |
| | OPTIONAL, -- Cond NonCodebook |
| ... | |
| } | |
| }, | |
| usage | ENUMERATED {beamManagement, |
| codebook, nonCodebook, antennaSwitching}, | |
| alpha | Alpha |
| | OPTIONAL, -- Need S |
| p0 | INTEGER (-202..24) |
| | OPTIONAL, -- Cond Setup |
| pathlossReferenceRS | CHOICE { |
| ssb-Index | SSB-Index, |
| csi-RS-Index | NZP-CSI-RS-ResourceId |
| SRS-SpatialRelationInfo ::= | SEQUENCE { |
| servingCellId | ServCellIndex |
| OPTIONAL, -- Need S | |
| referenceSignal | CHOICE { |
| ssb-Index | SSB-Index, |
| csi-RS-Index | NZP-CSI-RS-ResourceId, |
| srs | SEQUENCE { |
| resourceId | SRS-ResourceId, |
| uplinkBWP | BWP-Id |
| } | |
| } | |
| } | |
| SRS-ResourceId ::= | INTEGER (0..maxNrofSRS-Resources-1) |

In Table 8, usage represents a higher layer parameter which indicates whether an SRS resource set is used for beam management or is used for codebook-based or non-codebook-based transmission. A usage parameter corresponds to a L1 parameter 'SRS-SetUse'. 'spatialRelation-Info' is a parameter which represents a configuration of a spatial relation between a reference RS and a target SRS. Here, a reference RS may be a SSB, a CSI-RS or a SRS corresponding to a L1 parameter 'SRS-SpatialRelationInfo'. The usage is configured per SRS resource set. A terminal determines a Tx beam for an SRS resource which will be transmitted based on SRS-SpatialRelation Info included in the SRS-Config IE (S1020). Here, SRS-SpatialRelation Info is configured per SRS resource and represents whether the same beam as a beam used in a SSB, a CSI-RS or a SRS will be applied per SRS resource. In addition, SRS-SpatialRela-tionInfo may be configured or may not be configured for each SRS resource.

If SRS-SpatialRelationInfo is configured for an SRS resource, the same beam as a beam used in a SSB, a CSI-RS or a SRS is applied and transmitted. But, if SRS-SpatialRe-lationInfo is not configured for an SRS resource, the termi-nal randomly determines a Tx beam and transmits an SRS through the determined Tx beam (S1030).

In more detail, for a P-SRS that 'SRS-ResourceConfig-Type' is configured as 'periodic':
i) when SRS-SpatialRelationInfo is configured as 'SSB/PBCH', a UE transmits a corresponding SRS resource by applying the same spatial domain transmission filter (or generated by a corresponding filter) as a spatial domain Rx filter used for SSB/PBCH reception; or
ii) when SRS-SpatialRelationInfo is configured as 'CSI-RS', a UE transmits a SRS resource by applying the same spatial domain transmission filter used for peri-odic CSI-RS or SP (semi-persistent) CSI-RS reception; or
iii) when SRS-SpatialRelationInfo is configured as 'SRS', a UE transmits a corresponding SRS resource by applying the same spatial domain transmission filter used for periodic SRS transmission.

Although 'SRS-ResourceConfigType' is configured as 'SP(semi-persistent)-SRS' or 'AP(aperiodic)-SRS', a beam determination and transmission operation may be applied in a way similar to the above.

Additionally, a terminal may receive or may not receive a feedback on an SRS from a base station as in the following three cases (S1040).
i) when Spatial Relation Info is configured for all SRS resources in a SRS resource set, a terminal transmits an SRS with a beam indicated by a base station. For example, when Spatial_Relation_Info indicates all the same SSB, CRI or SRI, a terminal repetitively transmits an SRS with the same beam. This case corresponds to FIG. 13(a) as a usage for a base station to select an Rx beam.
ii) Spatial_Relation_Info may not be configured for all SRS resources in an SRS resource set. In this case, a terminal may transmit with freely changing SRS beams. In other words, this case corresponds to FIG. 13(b) as a usage for a terminal to sweep Tx beams.
iii) Spatial_Relation_Info may be configured only for a part of SRS resources in an SRS resource set. In this case, for a configured SRS resource, an SRS may be transmitted with an indicated beam, and for a SRS resource that Spatial_Relation_Info is not configured an SRS may be transmitted by randomly applying a Tx beam by a terminal.

Event-Based High-Speed Beam Reporting

In the present disclosure, beam reporting may include measurement information of a terminal for a reference signal (RS) resource. A RS resource may include at least one of a CSI-RS resource or a SSB resource and in the present disclosure, a RS resource may include any resource corre-sponding to a beam without being limited to a CSI-RS/SSB resource.

In the present disclosure, beam reporting of a terminal may include at least one of event-based (or event-triggered) beam reporting which is transmitted from a terminal to a base station on a basis that an event is triggered or non-event-based (or non-event-triggered) beam reporting which is transmitted from a terminal to a base station based on a predetermined configuration without being triggered by an event. Regarding event-based beam reporting, a criteria that an event is triggered may be preconfigured from a base station to a terminal or may be predefined between a terminal and a base station without separate configuration signaling. Regarding non-event-based beam reporting, a predetermined configuration may include a configuration related to periodic, semi-persistent, aperiodic beam reporting.

In the present disclosure, beam reporting of a terminal may include high-speed beam reporting. High-speed beam reporting may include beam reporting based on L1 (layer 1, e.g., a PHY layer)/L2 (layer 2, e.g., a MAC layer) measurement. Beam reporting based on L3 (layer 3, e.g., a RRC layer) measurement (e.g., radio resource management (RRM) measurement/reporting) may not correspond to high-speed beam reporting because its latency and overhead are greater than L1/L2 measurement based beam reporting. For example, in a L3 beam reporting operation, an event-based RRM method uses a RACH procedure, so a signaling overhead is large. In addition, for L1/L2 beam reporting, a beam reporting operation which is initiated or triggered by a base station (e.g., gNB) is discussed and a specific operation of event-based L1/L2 beam reporting is not prepared.

In the present disclosure, a variety of examples of a beam reporting operation including event-based high-speed (e.g., L1/L2 measurement-based) beam reporting are described.

For example, examples of the present disclosure may include a beam reporting method for supporting improved mobility of handover, etc., a fast TRP/cell/beam change when a terminal moves.

In order for a base station to perform a serving TRP/cell/beam change when a terminal moves, a terminal may perform an operation of reporting a measurement value for a specific DL RS. For example, an operation in which a terminal reports a RRM measurement value, a value managed in L3 for a purpose of RRM such as handover, etc., may be performed. For example, an operation in which a terminal reports a CSI measurement value, a value managed in L1 (layer 1) to change a TRP/a panel/a beam in the same cell, may be performed. A L3 based beam reporting operation generally has larger signaling overhead and latency than a L1 based beam reporting operation and accordingly, power consumption of a terminal is larger. Specifically, frequent RRM reporting of a terminal may be triggered in a high-frequency band, an environment with high mobility of a terminal, a dense cell environment, which may cause a terminal power consumption and signaling overhead/latency problem. To reduce such a problem, the present disclosure describes various examples for improving L1 based beam reporting.

Hereinafter, regarding event-based beam reporting, an example of an event trigger criteria is described.

A scope of the present disclosure is not limited to a specific event trigger criteria described below and it may be applied to a criteria that a variety of events including an exemplary event described below are triggered. In addition, an exemplary event trigger criteria described below may be defined as being applied regarding L3 beam reporting, but it may be also applied as an event trigger criteria for event-based high-speed (e.g., L1/L2) beam reporting according to the present disclosure.

An information element (e.g., a ReportConfigNR IE) including a higher layer parameter related to event-based beam reporting may be defined. For example, a ReportConfigNR IE may specify a criteria for triggering of a NR measurement reporting event or a conditional handover (CHO) or a conditional PSCell (Primary Secondary cell) change (CPC), etc. For the following events (e.g., A1, A2, . . . ), a measurement reporting event and a CHO or CPC event may be based on a result of cell measurement. A result of cell measurement may be derived based on a SSB or a CSI-RS. In the following description, an entity may include a TRP/a cell/a panel/a beam.

Event A1: When a result of measurement for a serving entity gets better than a predetermined absolute threshold;

Event A2: When a result of measurement for a serving entity gets worse than a predetermined absolute threshold;

Event A3: When a result of measurement for a neighboring entity gets better than a PCell/a PSCell by a predetermined offset;

Event A4: When a result of measurement for a neighboring entity gets better than a predetermined absolute threshold;

Event A5: When a result of measurement for a PCell/a PSCell gets worse than a first absolute threshold, and a result of measurement for a neighboring entity/a SCell gets better than a second absolute threshold;

Event A6: When a result of measurement for a neighboring entity gets better than a SCell by a predetermined offset;

Conditional Event A3: When a conditional reconfiguration candidate gets better than a PCell/a PSCell by a predetermined offset;

Conditional Event A5: When a result of measurement for a PCell/a PSCell gets worse than a first absolute threshold, and a result of measurement for a conditional reconfiguration candidate gets better than a second absolute threshold;

Event I1: When interference gets higher than a predetermined threshold.

For Event I1, a measurement reporting event may be based on a cross link interference (CLI) measurement result and a CLI measurement result may be derived based on a SRS-RSRP or a CLI-RSSI.

A scope of the present disclosure is not limited to the event trigger criteria and it may be applied to a criteria that a variety of events including the exemplary event are triggered. In addition, the exemplary event trigger criteria may be defined as being applied regarding L3 beam reporting, but it may be also applied as an event trigger criteria for event-based high-speed (e.g., L1/L2) beam reporting according to the present disclosure.

Hereinafter, L1/L2 beam reporting parameter computation, reporting setting and a reporting method are described.

A scope of the present disclosure is not limited to examples of a L1/L2 beam reporting parameter described later and it may be also applied to a variety of other beam measurement result parameters such as L1-RSRQ, etc.

First, a CSI-RS for L1-RSRP and L1-SINR computation is described.

When specific NZP-CSI-RS-ResourceSet that a higher layer parameter, repetition, is configured as 'on' is configured for a terminal, a terminal may assume that CSI-RS resources in the specific NZP-CSI-RS-ResourceSet are transmitted on a different OFDM symbol, but they are transmitted through the same downlink spatial domain transmission filer. If a repetition parameter is configured as 'off', a terminal does not assume that CSI-RS resources in the specific NZP-CSI-RS-ResourceSet are transmitted through the same downlink spatial domain transmission filer.

When CSI-ReportConfig that a reportQuantity parameter is configured as "cri-RSRP", "cri-SINN" or "none" for a terminal is configured for a terminal, CSI-ResourceConfig for channel measurement (a higher layer parameter, resourcesForChannelMeasurement) includes NZP-CSI-RS-ResourceSet, a higher layer parameter, repetition, is configured for NZP-CSI-RS-ResourceSet and a higher layer parameter, trs-Info, is not configured, the same number (e.g., 1 or 2) of port number (e.g., nrofPorts) parameters for all CSI-RS resources in the set may be configured for a terminal. When a CSI-RS resource of the same OFDM symbol(s) as a SS/PBCH block is configured for a terminal, a terminal may assume that the CSI-RS and SS/PBCH block is QCL-ed as 'QCL-TypeD' when 'QCL-TypeD' is applicable. In addition, a terminal may not expect that a CSI-RS will be configured for PRBs overlapped with a SS/PBCH block. A terminal may assume that the same subcarrier spacing is applied to a CSI-RS and a SS/PBCH block.

Next, a channel state information framework is described.

Aperiodic CSI reporting may be triggered by DCI format 0_1 or 0_2 dp and reportTriggerSize or reportTriggerSizeForDCIFormat0_2 may be applied.

Time and frequency resources which may be used for CSI reporting of a terminal may be controlled by a base station. CSI may be configured with a CQI, a PMI, CRI, a SSBRI, a LI (layer indicator), a RI, L1-RSRP or a L1-SINR.

For a CQI, a PMI, CRI, a SSBRI, a LI, a RI, L1-RSRP, a L1-SINR, N (N is equal to or greater than 1) CSI-ReportConfig reporting settings, M (M is equal to or greater than 1) CSI-ResourceConfig resource settings and 1 or 2 lists for a trigger state (it is given by a higher layer parameter, CSI-AperiodicTriggerStateList and CSI-SemiPersistentOnPUSCH-TriggerStateList) may be configured by a higher layer for a terminal. Each trigger state of CSI-AperiodicTriggerStateList may include a list associated with CSI-ReportConfig indicating a resource set identifier (Resource Set IDs) for a channel and selectively for interference. Each trigger state of CSI-SemiPersistentOnPUSCH-TriggerStateList may include one associated CSI-ReportConfig.

Next, a reporting setting is described.

Each CSI-ReportConfig, a reporting setting, may be associated with one downlink BWP (it is indicated by a higher layer parameter, BWP-Id) given in associated CSI-ResourceConfig for specifying a channel and may include parameter(s) for one CSI reporting band. Such parameter(s) may include a codebook configuration including a codebook subset restriction, a time-domain behavior, a frequency granularity for a CQI and a PMI, a measurement restriction configuration and CSI-related quantity which will be reported by a terminal such as a LI, L1-RSRP, a L1-SINR, a CRI, a SSBRI. CSI-related quantity may indicate what kind of reporting information (e.g., at least one of a CQI, a PMI, CRI, a SSBRI, a LI, a RI, L1-RSRP, a L1-SINR, L1-RSRQ) is reported.

A time domain operation of CSI-ReportConfig may be indicated by a higher layer parameter, reportConfigType, and may be configured aperiodically, semi-persistently on a PUCCH, semi-persistently on a PUSCH or periodically. For periodic and semi-persistent CSI reporting, a period and a slot offset according to a numerology of a UL BWP configured to transmit CSI reporting may be applied. A higher layer parameter, reportQuantity, may indicate CSI-related, L1-RSRP-related, or L1-SINR-related quantity which will be reported. reportFreqConfiguration may indicate a reporting granularity in a frequency domain which includes a CSI reporting band and indicate whether PMI/QCI reporting is wideband or sub-band. A timeRestrictionForChannelMeasurements parameter of CSI-ReportConfig may be configured to enable a time domain restriction on channel measurement and a timeRestrictionForInterference- Measurements parameter may be configured to enable a time domain restriction on interference measurement. CSI-ReportConfig may include CodebookConfig and it may include configuration parameters for Type-I, Type II or enhanced Type II CSI including a codebook subset restriction and a configuration for group-based reporting.

Next, L1-RSRP reporting is described. In case of being resource-wise QCL-ed as 'QCL-Type C' and if applicable, 'QCL-TypeD', for L1-RSRP computation, a CSI-RS resource, a SS/PBCH block resource, or both of a CSI-RS resource and a SS/PBCH block resource may be configured for a terminal. A CSI-RS resource setting of up to 16 CSI-RS resource sets having up to 64 resources in each set may be configured for a terminal. The total number of different CSI-RS resources may not exceed 128 across all resource sets.

For L1-RSRP reporting, when a higher layer parameter (e.g., nrofReportedRS) for the number of RSs reported in CSI-ReportConfig is configured as 1, a reported L1-RSRP value may be defined as a 7-bit value and may have a value in a 1 dB unit in a scope of [−140, −44] dBm. When a higher layer parameter (e.g., nrofReportedRS) for the number of reported RSs is configured as a value exceeding 1 or when a higher layer parameter (e.g., groupBasedBeamReporting) for group-based beam reporting is configured to be enabled, a terminal may use differential L1-RSRP based reporting. Here, the largest measured value of L1-RSRP is defined as a 7-bit value and has a value in a 1 dB unit in a scope of [−140, −44] dBm and differential L1-RSRP may be defined as a 4-bit value. A differential L1-RSRP value has a value in a 2 dB unit based on the largest measured L1-RSRP value and it may correspond to part of the same L1-RSRP reporting instance. Mapping between a reported L1-RSRP value and a measured value may be separately defined.

Next, L1-SINR reporting is described. For L1-SINR computation, a NZP CSI-RS resource and/or a SS/PBCH block resource may be configured for a terminal for channel measurement and a NZP CSI-RS resource or a CSI-IM resource may be configured for a terminal for interference measurement.

For channel measurement, a CSI-RS resource setting of up to 16 resource sets having a total of up to 64 CSI-RS resources or up to 64 SS/PBCH block resources may be configured for a terminal.

For L1-SINR reporting, when a higher layer parameter (e.g., nrofReportedRSForSINR) for the number of RSs reported for a SINR in CSI-ReportConfig is configured as 1, a reported L1-SINR value may be defined as a 7-bit value and may have a value in a 0.5 dB unit in a scope of [−23, 40] dBm. When a higher layer parameter (e.g., nrofReportedRSForSINR) for the number of reported RSs is configured as a value exceeding 1 or when a higher layer parameter (e.g., groupBasedBeamReporting) for group-based beam reporting is configured to be enabled, a terminal may use differential L1-SINR based reporting. Here, the largest measured value of a L1-SINR is defined as a 7-bit value and has a value in a 0.5 dB unit in a scope of [−23, 40] dBm and a differential L1-SINR may be defined as a 4-bit value. A differential L1-SINR value has a value in a 1 dB unit based on the largest measured L1-SINR value and it may correspond to part of the same L1-SINR reporting instance. Mapping between a reported L1-RSRP value and a measured value may be separately defined.

When a NZP CSI-RS is configured for channel measurement and/or interference measurement, a reported L1-SINR value may be defined not to be compensated by power offset(s) given by a higher layer parameter for power control (e.g., powerControlOffsetSS or powerControlOffset).

Figure 15:
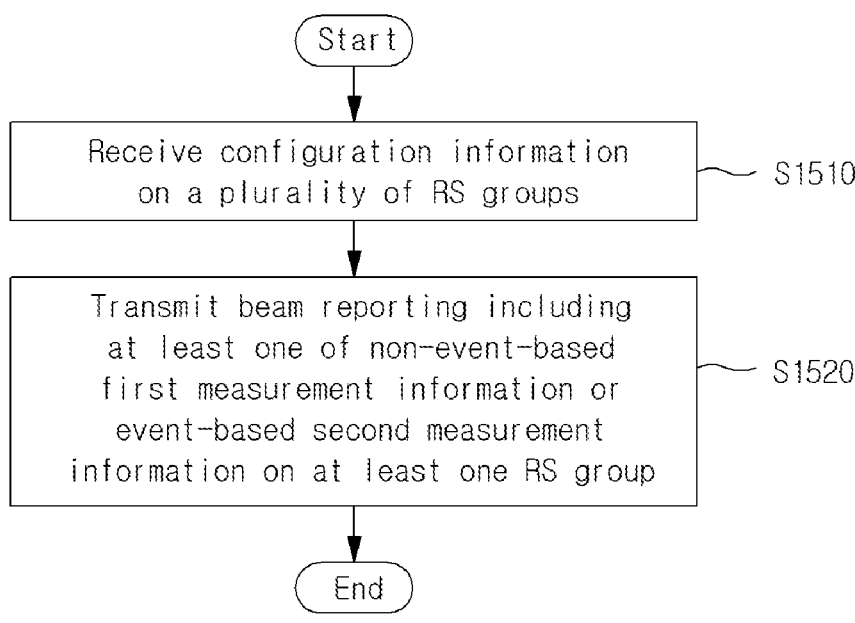
FIG. 15 is a diagram for describing a beam reporting method of a terminal according to an embodiment of the present disclosure.

FIG. 15 is a diagram for describing a beam reporting method of a terminal according to an embodiment of the present disclosure.

For the above-described L1/L2 beam reporting parameter computation, reporting setting and reporting method, unlike when one RS group (e.g., specific NZP CSI-RS-Resource-Set) is configured for a terminal and a L1/L2 beam reporting parameter is reported on a non-event-based basis (e.g., periodically/semi-persistently/aperiodically), a plurality of RS groups may be configured for a terminal and a L1/L2 beam reporting parameter may be reported on an event-based basis in the following examples.

Unlike when the above-described event-based beam reporting has a large additional signaling overhead and latency to report a RRM measurement value, a L3 beam reporting parameter, L1/L2 beam reporting may be performed without separate signaling and latency increase on an event-based basis in the following examples.

In S1510, a terminal may receive configuration information on a plurality of reference signal (RS) groups from a base station.

Configuration information on a RS group may include configuration information on a RS group subject to beam reporting. Here, a RS may include a physical layer signal/channel such as a synchronization signal, a SSB, etc. as well as various types of RSs in a wireless communication system. A RS group may correspond to a RS resource set or a RS resource group. For example, a RS group may correspond to a CSI-RS resource set/group or a SSB (resource) set/group. For a description for a variety of examples of the present disclosure, a RS group may be simply referred to as a resource group or a resource set.

A RS group may include RS(s) associated with/having the same cell identifier and/or scrambling ID. For example, a first RS group may be associated with a first entity and a second RS group may be associated with a second entity. Here, an entity may be defined by a combination of one or two or more of a TRP, a cell, a panel or a beam. For example, a first RS group may be associated with a serving cell and a second RS group may be associated with a neighboring cell.

Configuration information on a RS group may include a reporting characteristic per each RS group. A reporting characteristic may include whether of non-event-based or event-based reporting. A period/an offset, etc. for each non-event-based or event-based reporting may be configured. In addition, a reporting characteristic may include information on the number of RSs which will be reported (or measurement information or the number of beam quality values). In addition, a specific RS group transmitted in a cell, not a serving cell (e.g., a neighboring cell), may include a RS for RRM/mobility (e.g., a SSB of other cell, a CSI-RS for mobility).

Configuration information on a RS group may include criteria information on event trigger. An event trigger criteria may include at least one of a relative comparison of beam quality values of the best RS between a specific RS group and other RS group or a comparison with an absolute threshold for a beam quality value of the best RS of a specific RS group. In addition, an event may be defined based on one or a plurality of measurement samples.

In S1520, a terminal may transmit to a base station beam reporting including at least one of non-event-based first measurement information on at least one RS group of a plurality of RS groups or event-based second measurement information.

Here, first and second measurement information is L1-measurement information. For example, L1-measurement information may include L1-RSRP, a L1-SINR, L1-RSRQ, etc.

Among measurement information on each of a plurality of RS groups, at least one RS group having the best/good measurement information may be selected by a terminal. For at least one selected RS group, at least one of first measurement information or second measurement information may be reported by a terminal.

Event-based second measurement information may be reported when an event is triggered for a specific RS group of a plurality of RS groups. For example, a specific RS group may be a neighboring RS group.

Non-event-based first measurement information may be reported periodically, semi-persistently or aperiodically. In other words, first measurement information may be reported regardless of event trigger for the remaining RS groups excluding a specific RS group of a plurality of RS groups. In addition, first measurement information may be partially/wholly omitted and transmitted based on a size restriction on a reporting payload.

Beam reporting including at least one of first or second measurement information may be transmitted from a terminal to a base station based on at least one of uplink control information (UCI), a MAC-CE, a PUCCH, a PUSCH, a grant-based, configured-grant. For example, for beam reporting including event-based second measurement information for a specific RS group, after whether an event occurs is reported through a PUCCH, specific information such as beam quality information, etc. may be reported through a subsequent PUSCH.

Additionally or alternatively, beam reporting may further include information representing which RS group first or second measurement information is about, information on whether an event occurs, etc.

Additionally or alternatively, non-event-based first measurement information and event-based second measurement information may be multi-part-encoded and reported. For example, a first part may include first measurement information and additionally include at least one of whether second measurement information exists or part of second measurement information. A second part may include all of second measurement information or the remaining part of second measurement information.

Additionally or alternatively, regardless of whether an event occurs, a CSI payload size (or a size restriction) assuming that second measurement information is included or assuming that second measurement information is not included may be preconfigured/predefined and based on it, a beam reporting transmission resource (e.g., a PUCCH resource, the number of PUSCH piggyback resource elements, etc.) may be determined.

Additionally or alternatively, the same transmission resource may be configured for transmission of non-event-based first measurement information and event-based second measurement information. In other words, only non-event-based beam reporting may be transmitted, only event-based beam reporting may be transmitted or non-event-based beam reporting and event-based beam reporting may be transmitted together on the same transmission resource.

Additionally or alternatively, for non-event-based first measurement information and event-based second measurement information, each separate transmission resource may be allocated. In other words, a reserved first resource for non-event-based beam reporting and a reserved second resource for event-based beam reporting may be separately configured/allocated.

Additionally or alternatively, when a payload size of actual beam reporting information is greater than the maximum payload size available for beam reporting, part of beam reporting may be omitted.

Additionally or alternatively, for event-based beam reporting, a time when reporting is allowed and a time when reporting is not allowed may be separately configured.

Figure 16:
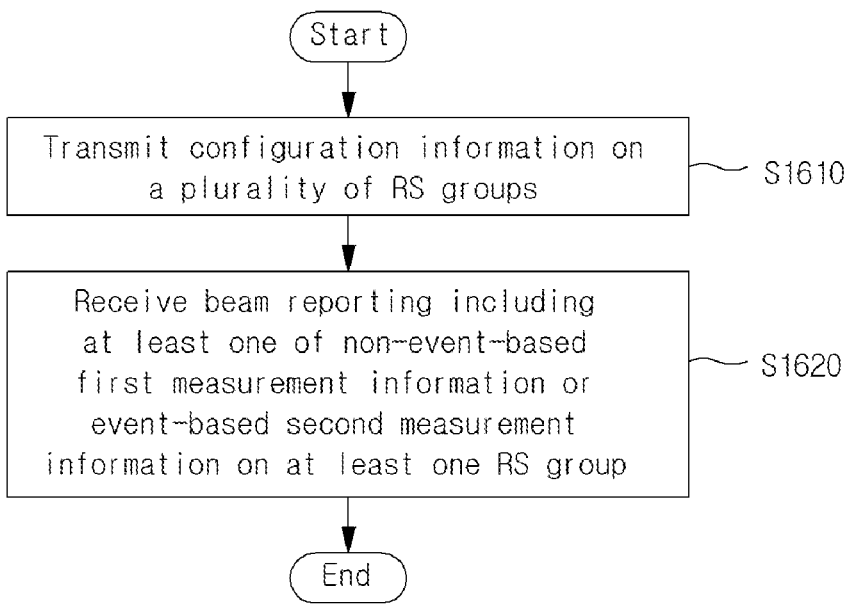
FIG. 16 is a diagram for describing a method in which a base station receives beam reporting from a terminal according to an embodiment of the present disclosure.

FIG. 16 is a diagram for describing a method in which a base station receives beam reporting from a terminal according to an embodiment of the present disclosure.

In S1610, a base station may transmit to a terminal configuration information on a plurality of reference signal (RS) groups.

For a specific matter on configuration information on a RS group, a description referring to S1510 in FIG. 15 may be applied, so an overlapping description is omitted.

In S1620, a base station may receive from a terminal beam reporting including at least one of non-event-based first measurement information on at least one RS group of a plurality of RS groups or event-based second measurement information.

For a specific matter on first measurement information and second measurement information, a description referring to S1520 in FIG. 15 may be applied, so an overlapping description is omitted.

Hereinafter, specific examples of the present disclosure are described. Embodiments described below may be applied separately and two or more combinations may be also applied.

Embodiment 1

According to this embodiment, a base station may configure to a terminal L1 beam reporting for a plurality of RS groups or one RS group. Accordingly, a terminal may select one or a plurality of RS(s) having the best measurement information or beam quality value (e.g., L1-RSRP/a L1-SINR) for each configured RS group.

For specific RS group(s) (or all of at least one RS group) of at least one RS group, only when a predefined event occurs, beam information on the specific RS group(s) (e.g., whether an event occurs, RS ID(s) selected by a terminal, and/or corresponding beam quality value(s)) may be included in beam reporting information or a terminal may update and report beam information.

For the remaining RS group(s) other than the specific RS group(s), beam reporting may be performed regardless of whether a predefined event occurs. It is described below by referring to Embodiment 1-2. When an event occurs, beam reporting information on the remaining RS group(s) may be omitted or part of beam reporting information may be omitted. It considers a payload size (or a size restriction) of beam reporting information and it is described below by referring to Embodiment 1-5.

In the following description, for simplicity, L1 beam reporting for a plurality of RS groups is configured for a terminal, it is assumed that one specific RS group of a plurality of RS groups (i.e., a RS group associated with event-based beam reporting) is included and it is assumed that the remaining RS group(s) are associated with non-event-based beam reporting. But, a scope of the present disclosure includes a case in which all of a plurality of RS groups that L1 beam reporting is configured correspond to a specific RS group or a case in which a plurality of specific RS groups are associated with event-based beam reporting.

Configuration information on a plurality of RS groups may include configuration information on whether event-based reporting will be performed per RS group or whether periodic (or semi-persistent) reporting based on an indication/a configuration of a base station will be performed. For example, configuration information on a plurality of RS groups may be provided for a terminal through higher layer (e.g., RRC) signaling.

In addition, configuration information on a plurality of RS groups may include configuration information on a period during which non-event-based beam reporting will be performed or event-based beam reporting may be performed, a slot/symbol offset, etc. For example, in addition to a period/slot (or symbol) offset value (i.e., a period/an offset for non-event-based beam reporting) configured per reporting configuration type (reportconfigtype) through a CSI reporting related configuration (e.g., CSI-ReportConfig), a period/slot (or symbol) offset value for event-based beam reporting may be configured.

Configuration information on a plurality of RS groups may include the number of RSs which will be reported by a terminal per RS group, the number of measurement information (or beam quality values), etc. For example, in addition to the number of RSs/the number of measurement information for non-event-based beam reporting, the number of RSs/the number of measurement information for event-based beam reporting may be configured.

RS(s) in one same RS group may be associated with or correspond to the same cell identifier (e.g., a physical cell identifier (PCI), a serving cell ID). Additionally or alternatively, RS(s) in one same RS group may have the same scrambling ID or may be associated with it.

A specific RS group performing event-based beam reporting may be transmitted in a cell, not a serving cell (e.g., a neighboring cell). Additionally or alternatively, a specific RS group performing event-based beam reporting may be configured with RSs configured for RRM/mobility (e.g., a SSB of other cell, a CSI-RS for mobility).

Examples of an event are as follows.

Event ex1: When a beam quality value of a RS measured as having the best quality of a corresponding RS group (i.e., the best RS) is better than a beam quality value of the best RS of other RS group by a predetermined offset value or more For example, a predetermined offset may be predefined or configured by a base station and an offset value may be configured as 0 or may be configured as a non-zero value. For example, other RS group may be a designated or predefined RS group.

Event ex2: When a beam quality value of the best RS of a corresponding RS group is better than a predetermined threshold For example, a predetermined threshold may be predefined or configured by a base station.

Event ex3: When a beam quality value of the best RS of a corresponding RS group is better than a predetermined first threshold and a beam quality value of the best RS of other RS group is worse than a predetermined second threshold For example, a first threshold and/or a second threshold may be predefined or configured by a base station. For example, other RS group may be a designated or predefined RS group.

Event ex4: When at least one of the event ex1, ex2, or ex3 occurs in a plurality of measurement instances (or samples) Measurement accuracy may not be enough only with a single measurement instance, so whether an event is triggered may be defined based on a specific time duration or a plurality of measurement samples. For example, whether an event occurs may be determined based on a value obtained by measuring beam quality for a specific time duration or by using a plurality of measurement samples in event ex1/ex2/ex3. For example, when event ex1/ex2/ex3 occurs N (N may be predefined or preconfigured as a value of 1 or more) times or more, it may be determined that it satisfies an event trigger criteria. Further, when event ex1/ex2/ex3 occurs N times or more within a predetermined time duration and/or consecutively, it may be determined that it satisfies an event trigger criteria.

When an event trigger criteria described above is satisfied, a terminal may determine that an event is triggered and perform event-based beam reporting.

For example, for a description on the above-described event ex1, ex2, ex3, ex4, "a corresponding RS group" is a RS group that whether an event occurs is monitored and may be a RS group associated with a neighboring cell. In addition, "other RS group" may be a RS group associated with a serving cell.

The above-described measurement information or beam reporting information may be L1 information (e.g., UCI), L2 information (e.g., a MAC-CE). In addition, the above-described measurement information or beam reporting information may be transmitted through a PUCCH or a PUSCH. PUSCH transmission may be grant-based PUSCH transmission or configured grant-based PUSCH transmission.

When beam information is reported through a configured grant-based PUSCH, it may be defined to allow only event-based beam reporting. In other words, when an event is triggered or occurs, beam reporting information may be transmitted through a preconfigured PUSCH.

When beam information is reported through a PUCCH and event-based beam reporting is allowed/configured/defined, a specific PUCCH format (e.g., PUCCH format 0/1) may be used to inform whether an event occurs through a small amount of information (e.g., a 1-bit to several bits) for PUCCH resource efficiency. Subsequently, detailed information on a corresponding event (e.g., a beam ID, quality value information, etc.) may be transmitted in a form of UCI/a MAC-CE through a PUSCH.

Embodiment 1-1

An exemplary operation according to the above-described embodiment 1 may be assumed as follows.

A base station may configure to a terminal periodic beam reporting (i.e., non-event-based beam reporting) through a PUCCH for one SSB/CSI-RS resource group for a serving cell (e.g., a first resource group (or a first RS group)) and one SSB/CSI-RS resource group for neighboring cell(s) (e.g., a second resource group (or a second RS group)). Additionally, a base station may configure event-based beam reporting to a terminal for a second resource group (or a second RS group) for neighboring cell(s).

A terminal may report beam information for a serving cell at a reporting time when an event does not occur (i.e., N resource ID (or RS ID)(s) for a first resource group and L1-RSRP/L1-SINR(s) of corresponding resource(s)).

A terminal may report beam information for a neighboring cell at a reporting time when an event occurs (i.e., N resource ID (or RS ID)(s) for a second resource group and L1-RSRP/L1-SINR(s) of corresponding resource(s)).

Alternatively, a terminal may perform beam reporting for a first resource group for some (e.g., N–1) of N and perform beam reporting for a second resource group for the rest (e.g., 1) of N when an event occurs.

Here, a problem may occur that a base station may not clearly know in which resource group (or RS group) a terminal selects a resource (or a RS) or to which resource group (or RS group) each of N beam reporting belongs.

To solve it, resource group information reported by a terminal (e.g., a resource group ID or a RS group ID) or information on whether an event occurs may be additionally reported.

Alternatively, resource group information reported by a terminal (e.g., a resource group ID or a RS group ID) or information on whether an event occurs may be reported by being replaced with all or part of reporting information for a first resource group. For example, when an event occurs, a terminal may inform a base station that an event occurs by using an unused (e.g., reserved) state in a beam reporting information field for a first resource group (e.g., a RS ID field or a L1-RSRP/L1-SINR/L1-RSRQ field) (or in part of it).

Here, additional beam information for a second resource group (e.g., beam RS ID(s), beam quality value(s)) may be transmitted through the same uplink resource together with beam reporting information for a first resource group (including or not including whether an event occurs) and may be transmitted through other uplink resource distinguished from beam reporting information for a first resource group (including or not including whether an event occurs).

When beam reporting information for a first and second resource group is transmitted through the same uplink resource, a problem may occur that a size of information reported by a terminal is different according to whether an event occurs. To solve it, a method such as multi-part encoding, adaptive PUCCH resource allocation, reporting information omission, etc. may be applied and a detailed description thereof will be described later.

When beam reporting information on a first and second resource group is transmitted through a different uplink resource, additional beam information on a second resource group may be transmitted only once when an event occurs, i.e., aperiodically. The additional beam information may be transmitted as physical layer information, UCI, or may be transmitted as a MAC-CE through an uplink-shared channel (UL-SCH).

When there is no UL-SCH allocated to a terminal when an event occurs, a base station may allocate a PUSCH to a terminal for corresponding reporting.

Aperiodic reporting of event-based beam information may be distinguished from aperiodic reporting of non-event-based beam information transmitted by a terminal at a request of a base station in that whether an event is triggered is determined by a terminal and a base station does not determine whether an event is triggered.

As such, information (e.g., a RS group ID) representing which resource group (or RS group) beam reporting is for may be included in beam reporting information. Additionally or alternatively, information on whether an event occurs may be included in beam reporting information. Information on whether an event occurs may include information on whether an event occurs per resource group (or RS group). Information on whether an event occurs may be reported by utilizing an unused or reserved state (or bit value) of a field which is configured or is preconfigured/predefined as an additional field (e.g., a RS ID and/or a L1-RSRP/L1-SINR/L1-RSRQ field).

Embodiment 1-2

When beam reporting including L1 measurement information is performed as described above, a beam reporting payload size may vary depending on whether an event occurs in a terminal. Accordingly, a problem may occur in decoding corresponding beam reporting by a base station. Specifically, when beam reporting information is transmitted through UCI, beam reporting information may not be decoded in a base station when a payload size is not clearly determined in advance. The present disclosure may be applied not only to a case in which beam reporting information is configured with UCI, but also to a case in which beam reporting information is configured in other form such as a MAC-CE, etc.

In addition, when an uplink resource allocated/configured for non-event-based beam reporting and an uplink resource allocated/configured for event-based beam reporting are the same uplink resource, a decoding problem of a base station may occur when a payload size varies depending on whether an event occurs.

To solve the problem, multi-part encoding that beam reporting information is divided into a plurality of parts and separately encoded may be applied. Multi-part encoding may include the following example.

As a first example, a first part may include non-event-based reporting (i.e., beam reporting for RS resource group (s) that event-based reporting is not configured), and information representing whether a second part exists. A second part may include event-based beam reporting.

For example, whether a second part exists may be included as 1-bit information. A 1-bit indicator representing whether a second part exists may be also applied when beam reporting information is configured in a MAC-CE form. When the 1-bit information represents that there is no event-based reporting information, a second part may be omitted.

As a second example, a first part may include N-bit information for part(s) of non-event-based reporting and event-based reporting. A second part may include the remaining part(s) of event-based reporting.

For example, N-bit information for part(s) of event-based reporting may include all or part of reporting information for RS ID(s) for event-based reporting. For example, only the best RS ID of event-based reporting information may be included in a first part and reported and the remaining RS ID(s) including a second best RS ID and beam quality values (i.e., the best RS ID and beam quality values for the remaining RS IDs) may be included in a second part and reported. For example, all of RS ID(s) may be included in a first part and reported and beam quality value(s) may be included in a second part and reported.

For example, when an event does not occur (i.e., when event-based beam reporting is not transmitted), a terminal may be defined to transmit a predetermined promised value (e.g., a reserved codepoint of a RS ID field) to the N-bit information. In this case, a second part may be omitted.

As a third example, a first part may include N-bit information on part(s) of non-event-based reporting and event-based reporting, and 1-bit information representing whether a second part exists. A second part may include the remaining part(s) of event-based reporting.

For example, when the 1-bit information represents that there is event-based reporting information, N-bit information for part(s) of event-based reporting may include all or part of reporting information for RS ID(s) for event-based reporting. For example, only the best RS ID of event-based reporting information may be included in a first part and reported and the remaining RS ID(s) including a second best RS ID and beam quality values (i.e., the best RS ID and beam quality values for the remaining RS IDs) may be included in a second part and reported. For example, all of RS ID(s) may be included in a first part and reported and beam quality value(s) may be included in a second part and reported.

For example, when the 1-bit information represents that there is no event-based reporting information, a second part may be omitted.

A third example corresponds to a method in which a first and second example are applied together and may be applied when there is no reserved codepoint/bit value in N-bit information.

Embodiment 1-3

When a beam reporting payload size varies depending on whether an event occurs in a terminal, in order to optimize an uplink transmission resource (e.g., a PUCCH resource) according to whether an event occurs, a first resource which will be used when an event occurs and a second resource which will be used when an event does not occur may be separately configured/allocated by a base station to a terminal. Accordingly, a terminal may perform beam reporting through a different resource according to whether an event occurs. For example, a first PUCCH resource associated with non-event-based beam reporting and a second PUCCH resource associated with event-based beam reporting may be separately configured for a terminal.

Embodiment 1-4

When a beam reporting payload size varies depending on whether an event occurs in a terminal, if a base station does not accurately know a PUCCH resource which is selected and transmitted by a terminal, a problem may occur that a base station should perform blind decoding for all PUCCH resources, or that a restriction occurs on a PUCCH resource allocated to a terminal. In addition, even when UCI is piggybacked and transmitted to a PUSCH, a base station may not accurately know the number of coded REs for UCI if a UCI payload size is variable, so a problem about PUSCH decoding may occur. In other words, a problem may occur due to variability of a beam reporting payload size in a UCI multiplexing process, a PUCCH resource selection process for multi-CSI, etc.

To solve such a problem, it may be defined to assume a size of a beam reporting payload as a predetermined size regardless of whether an event occurs actually (or independently from whether an event occurs). Based on such a predetermined size, a terminal may be defined to select a PUCCH resource for UCI transmission or determine the number of coded REs for a PUSCH for UCI piggyback.

A predetermined size may be preconfigured by signaling between a base station and a terminal or may be predefined between a base station and a terminal without separate signaling.

For example, a predetermined size may be also determined based on a beam reporting information payload size when an event occurs. Alternatively, a predetermined size may be also determined based on a beam reporting information payload size when an event does not occur.

For example, a terminal may be defined to assume a CSI payload size corresponding to one state of 'event occurrence' or 'no event occurrence' and based on it, to select a PUCCH resource for UCI multiplexing and/or determine the number of coded REs for UCI piggyback in a PUSCH.

Specifically, a terminal may perform UCI multiplexing transmission by selecting a corresponding PUCCH resource based on a total of UCI payload sizes including a corresponding CSI payload (and the maximum UCI coding rate configured) in a state that a predetermined CSI payload size is always assumed regardless of whether an event actually occurs. In addition, in a state that the predetermined CSI payload size is assumed, UCI piggyback transmission may be performed by calculating the number of REs which will be used for mapping of UCI (i.e., a coded bit) including corresponding CSI on a PUSCH based on a configured beta offset.

Embodiment 1-5

In a PUCCH/PUSCH resource configured/allocated by a base station to a terminal for beam reporting, a case may occur in which a payload size of actual beam reporting information is larger than the maximum payload size available for corresponding beam reporting information. For example, when additional transmission of event-based beam reporting information is required due to event occurrence, a size of a payload to be transmitted may exceed the maximum payload size. In this case, a terminal may be defined to omit part of beam reporting information.

With this regard, a rule for a priority of omitted information (omitting rule) or a rule for a priority of transmitted information (priority rule) may be defined.

For example, when non-event-based beam reporting collides with event-based beam reporting, all or part of non-event-based beam reporting may be omitted. For example, among a plurality of beam information on a RS group associated with non-event-based beam reporting, some beam information may be omitted. The number of omitted beam information may be determined based on a payload size (or a restriction on the maximum payload size) and the number of beam information to be transmitted or omitted may be preconfigured/predefined. For example, among a plurality of beam information on a RS group associated with non-event-based beam reporting, all or part of beam quality values (e.g., L1-RSRP/a L1-SINR/L1-RSRQ) may be omitted.

As an additional example, it may be defined to omit some reporting information of event-based beam reporting information or transmit it as reduced information/format. For example, an indicator for whether an event occurs may be necessarily included in reduced information. For example, an indicator for whether an event occurs, and the optimum RS ID information for a RS group that an event occurs may be necessarily included in reduced information. All or part of the remaining information (e.g., RS ID information, beam quality value information) other than necessary information as above may be omitted. The number of omitted information may be determined based on a payload size (or a restriction on the maximum payload size) and the number of beam information to be transmitted or omitted may be preconfigured/predefined.

As an additional example, without distinguishing from a non-event-based or event-based RS group, all or part of beam quality values (e.g., L1-RSRP/a L1-SINR/L1-RSRQ) may be omitted in reporting information for each RS group. The number of omitted beam quality value information may be determined based on a payload size (or a restriction on the maximum payload size) and the number of beam information to be transmitted or omitted may be preconfigured/predefined.

Embodiment 1-6

For event-based beam reporting, a time when beam reporting may be performed and a time when beam reporting may not be performed may be separately configured/designated.

For example, when a beam reporting period is configured as N slots, it may be defined that event-based beam reporting is not allowed (i.e., only non-event-based beam reporting is allowed) at a time corresponding to N, 3N, 5N, 7N, . . . and beam reporting including event-based beam reporting is allowed at a time of 2N, 4N, 6N, 8N, . . . . In other words, at a time when event-based beam reporting is allowed, non-event-based beam reporting and/or event-based beam reporting may be performed.

In this case, when an event occurs in a duration after a time of 0 before a time of 2N, a terminal may perform beam reporting including event-based beam reporting at a time of 2N. When an event occurs in a duration after a time of 2N before a time of 4N, beam reporting including event-based beam reporting may be performed at a time of 4N.

Alternatively, event-based beam reporting may be allowed at an odd-numbered time of N and event-based beam reporting may not be allowed at an even-numbered time of N.

It is just an example, and event-based beam reporting may be allowed at some times among all times configured to allow a terminal to perform beam reporting and event-based beam reporting may not be allowed at other times.

For example, information related to a time when the event-based beam reporting is allowed may be transmitted by a base station to a terminal through higher layer signaling (e.g., RRC/a MAC-CE).

Figure 17:
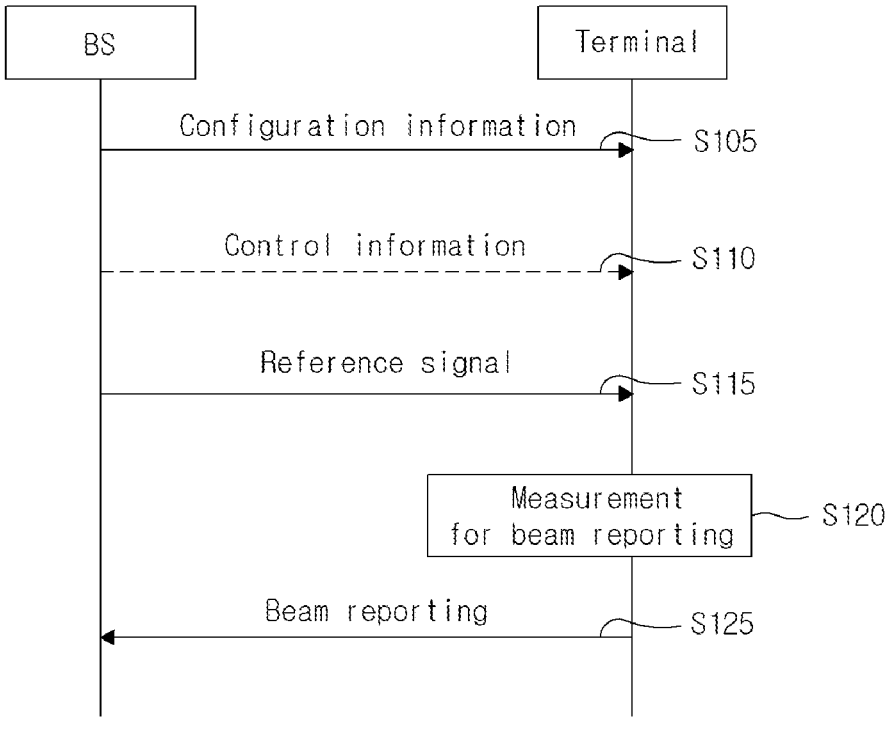
FIG. 17 is a diagram for describing a signaling method between a terminal and a base station according to an embodiment of the present disclosure.

FIG. 17 is a diagram for describing a signaling method between a terminal and a base station according to an embodiment of the present disclosure.

Figure 18:
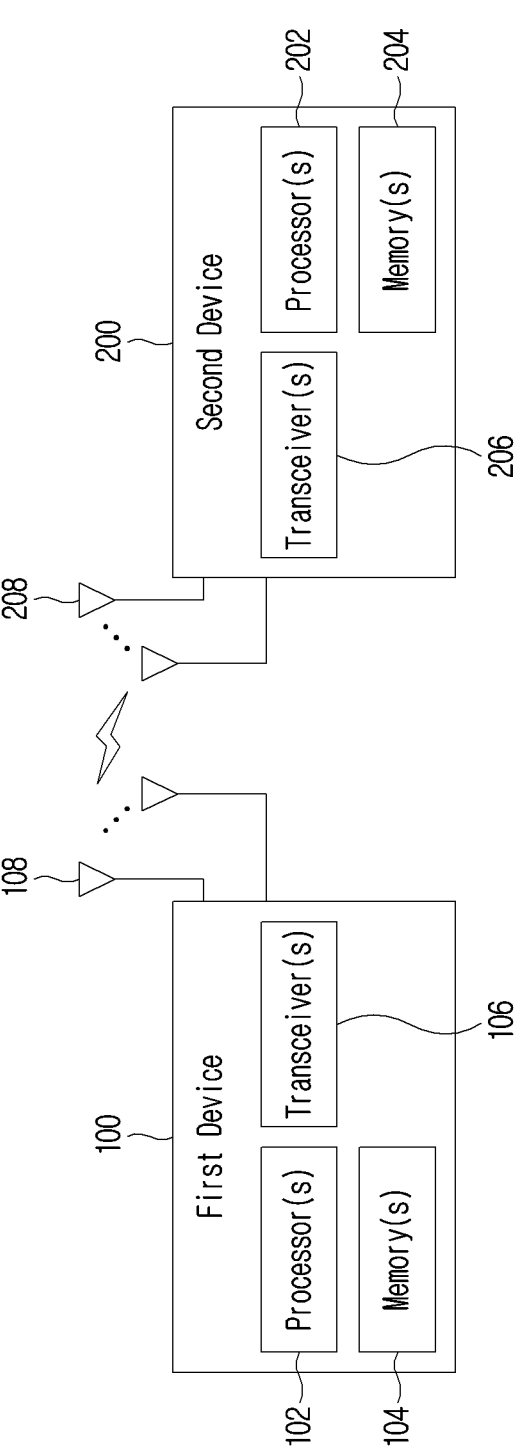
FIG. 18 is a diagram which illustrates a block diagram of a wireless communication device according to an embodiment of the present disclosure.

In FIG. 17, a base station (BS) and a terminal (UE) are just an example and may be applied by being replaced with a variety of devices as described in FIG. 18 and the above-described description. For example, a base station may be one base station including a plurality of TRPs and may be one cell including a plurality of TRPs. FIG. 17 is just for convenience of a description, and it does not limit a scope of the present disclosure. In addition, some step(s) shown in FIG. 17 may be omitted according to a situation and/or a configuration, etc. In addition, for an operation of a base station and a terminal in FIG. 17, the above-described descriptions may be referred to/used.

A base station may generally mean an object which performs transmission and reception of data with a terminal. For example, the base station may be a concept which includes at least one transmission point (TP), at least one transmission and reception point (TRP), etc. In addition, a TP and/or a TRP may include a panel, a transmission and reception unit, etc. of a base station. In addition, "TRP" may be applied by being replaced with a panel, an antenna array, a cell (e.g., a macro cell/a small cell/a pico cell, etc.), a transmission point (TP), a base station (base station, gNB, etc.), etc. As described above, a TRP may be classified according to information on a CORESET group (or a CORESET pool) (e.g., an index, a ID). In an example, when one terminal is configured to perform transmission and reception with multiple TRPs (or cells), it may mean that multiple CORESET groups (or CORESET pools) are configured for one terminal. Such a configuration for a CORESET group (or a CORESET pool) may be performed through higher layer signaling (e.g., RRC signaling, etc.).

UE may receive configuration information from a base station S105. In other words, a base station may transmit configuration information to UE. The configuration information may include at least one of system information (SI), scheduling information, a beam management(BM)-related configuration (e.g., a DL BM-related CSI-ResourceConfig IE/a NZP CSI-RS resource set IE, etc.), information related to a configuration of a base station (i.e., a TRP configuration), a CC/BWP-related configuration, a CORESET-related configuration, a CSI-related configuration (e.g., CSI-report-Config, CSI-reosurceConfig, etc.), or an uplink-related configuration (e.g., PUCCH-Config, PUSCH-Config, etc.) and further include additional information, if necessary. The configuration information may be transmitted through higher layer (e.g., RRC or a MAC CE) signaling. In addition, when the configuration information is predefined or preconfigured, a corresponding step may be omitted.

For example, the configuration information may include CORESET-related configuration information (e.g., a ControlResourceSet IE). The CORESET-related configuration information may include at least one of a CORESET-related ID (e.g., controlResourceSetID), an index of a CORESET pool for a CORESET (e.g., CORESETPoolIndex), a time/frequency resource configuration of a CORESET, or CORESET-related TCI information and further include additional information, if necessary. The index of a CORESET pool (e.g., CORESETPoolIndex) may mean a specific index mapped/configured to each CORESET (e.g., a CORESET group Index, a HARQ Codebook index).

For example, the configuration information may include at least one of configuration information related to CSI reporting (e.g., CSI-ReportConfig, CSI-ResourceConfig, NZP-CSI-RS-ResourceSet, NZP-CSI-RS-Resource, etc.), resource configuration information, a precoding matrix-related indication, or a codebook-related configuration and further include additional information, if necessary. For example, a different NZP CSI-RS resource may be configured for a single reporting setting (e.g., CSI-ReportConfig). For example, a group of at least one NZP-CSI-RS-ResourceSet, CSI-IM-ResourceSet and/or CSI-SSB-ResourceSet may be defined through a CSI-ResourceConfig IE. For example, at least one RS group for beam reporting may be configured based on the configuration information.

For example, as described in the above-described event-based high-speed (e.g., L1/L2 measurement based) beam reporting method (e.g., embodiment 1/1-1/1-2/1-3/1-4/1-5/1-6), the configuration information may include a configuration related to event-based beam reporting. For example, the configuration related to event-based beam reporting may include at least one of information on whether event-based reporting will be performed, period/slot (or symbol) offset information for event-based reporting, the number of RSs which will be reported per RS group, reporting quantity for event-based reporting (reportquantity), or information on an event-based reporting time and further include additional information, if necessary. For example, the configuration information may include uplink channel resource information for beam reporting. In an example, a resource for event-based beam reporting and a resource for non-event-based beam reporting may be configured, respectively. For example, the configuration information may include threshold/offset information related to a determination on whether an event occurs.

For example, an operation that UE (100/200 in FIG. 18) in S105 receives the configuration information from a base station (200/100 in FIG. 18) may be implemented by a device in FIG. 18 which will be described below. For example, in reference to FIG. 18, at least one processor 102 may control at least one transceiver 106 and/or at least one memory 104, etc. to receive the configuration information and at least one transceiver 106 may receive the configuration information from a base station.

UE may receive control information from a base station S110. In other words, a base station may transmit control information to UE. The control information may be received through a control channel (e.g., a PDCCH). In an example, the control information may be DCI. For example, the control information may include at least one of a downlink data channel (e.g., a PDSCH), scheduling information of an uplink channel (e.g., a PUCCH/a PUSCH), triggering information of CSI reporting, a MCS, or a field of precoding information and number of layers and further include additional information, if necessary. In addition, when the control information is predefined or preconfigured, a corresponding step may be omitted.

For example, an operation that UE (100/200 in FIG. 18) in S110 receives the control information from a base station (200/100 in FIG. 18) may be implemented by a device in FIG. 18 which will be described below. For example, in reference to FIG. 18, at least one processor 102 may control at least one transceiver 106 and/or at least one memory 104, etc. to receive the control information and at least one transceiver 106 may receive the control information from a base station.

UE may receive a reference signal from a base station S115. In other words, a base station may transmit a reference signal to UE. The reference signal may be received based on the configuration information. For example, the reference signal may be transmitted periodically/semi-persistently/aperiodically. For example, the reference signal may be received based on the above-described event-based high-speed (e.g., L1/L2 measurement based) beam reporting method (e.g., embodiment 1/1-1/1-2/1-3/1-4/1-5/1-6), the above-described beam management, the above-described CSI-related operation, etc. For example, the reference signal may correspond to at least one of a CSI-RS, a synchronization signal, a SSB.

For example, an operation that UE (100/200 in FIG. 18) in S115 receives the reference signal from a base station (200/100 in FIG. 18) may be implemented by a device in FIG. 18 which will be described below. For example, in reference to FIG. 18, at least one processor 102 may control at least one transceiver 106 and/or at least one memory 104, etc. to receive the reference signal and at least one transceiver 106 may receive the reference signal from a base station.

UE may perform measurement for beam reporting S120. For example, the measurement for beam reporting may be performed based on the above-described event-based high-speed (e.g., L1/L2 measurement based) beam reporting method (e.g., embodiment 1/1-1/1-2/1-3/1-4/1-5/1-6), the above-described beam management, the above-described CSI-related operation, the above-described L1-RSRP/L1-SINR-related operation. For example, measurement for beam reporting may be performed based on the above-described configuration information/DCI/reference signal.

For example, the measurement for beam reporting (e.g., RSRP/SINR measurement) may be performed per RS group. For example, UE may determine that an event occurred by comparing beam quality values of the best-quality RS of a specific RS group (e.g., L1-RSRP/a L1-SINR) based on a predetermined threshold and/or a predetermined offset.

For example, an operation that UE (100/200 in FIG. 18) in S120 performs the measurement for beam reporting may be implemented by a device in FIG. 18 which will be described below. For example, in reference to FIG. 18, at least one processor 102 may control at least one transceiver 106 and/or at least one memory 104, etc. to perform the measurement for beam reporting.

UE may transmit beam reporting to a base station S125. In other words, a base station may receive beam reporting from UE. The beam reporting may be transmitted through an uplink channel (e.g., a PUCCH/a PUSCH). Alternatively, in an example, the beam reporting may be transmitted through a MAC-CE. The beam reporting may be transmitted periodically/semi-persistently/aperiodically. For example, as described in the above-described event-based high-speed (e.g., L1/L2 measurement based) beam reporting method (e.g., embodiment 1/1-1/1-2/1-3/1-4/1-5/1-6), the beam reporting may include at least one of L1-RSRP, a L1-SINR, information on whether an event occurs, or reporting resource group information (e.g., a RS group ID) and further include additional information, if necessary. In addition, the beam reporting may also include beam reporting for a neighboring cell.

For example, the beam reporting may be configured with multi-parts (e.g., a first part and a second part). For example, first part/second part beam reporting may be configured based on an example of embodiment 1-2. For example, 1-bit signaling for whether a second part exists in a first part may be included. For example, a first part may include non-event-based beam reporting. A second part may include event-based beam reporting and in some cases, part of event-based beam reporting may be included in a first part. For example, the second part may be transmitted at a time when event-based reporting is possible.

For example, as described in embodiment 1-4, a terminal may assume a CSI payload always corresponding to one state of 'event occurrence' or 'no event occurrence' regardless of whether an event actually occurs and calculate a total UCI payload size including a corresponding CSI payload. For example, as described in embodiment 1-5, when a payload of information to be actually reported is larger than the maximum payload size which may be used in an uplink resource allocated for beam reporting, some beam reporting information may be reported by being omitted based on an omission rule/a priority rule.

For example, the above-described operation that UE (100/200 in FIG. 18) in S125 transmits the beam reporting to a base station (200/100 in FIG. 18) may be implemented by a device in FIG. 18 which will be described below. For example, in reference to FIG. 18, at least one processor 102 may control at least one transceiver 106 and/or at least one memory 104, etc. to transmit the beam reporting and at least one transceiver 106 may transmit the beam reporting to a base station.

As mentioned above, the above-described base station/UE signaling and operation (e.g., embodiment 1/1-1/1-2/1-3/1-4/1-5/1-6)/FIG. 15/16/17, etc.) may be implemented by a device which will be described below (e.g., device 100/200 in FIG. 18). For example, a base station may correspond to a first wireless device and UE may correspond to a second wireless device and in some cases, the opposite may be considered.

For example, the above-described base station/UE signaling and operation (e.g., embodiment 1/1-1/1-2/1-3/1-4/1-5/1-6)/FIG. 15/16/17, etc.) may be processed by at least one processor in FIG. 18 (e.g., 102, 202) and the above-described base station/UE signaling and operation (e.g., embodiment 1/1-1/1-2/1-3/1-4/1-5/1-6)/FIG. 15/16/17, etc.) may be stored in a memory (e.g., at least one memory in FIG. 18 (e.g., 104, 204)) in a form of a command/a program (e.g., an instruction, an executable code) for driving at least one processor in FIG. 18 (e.g., 102, 202).

General Device to which the Present Disclosure May be Applied

FIG. 18 is a diagram which illustrates a block diagram of a wireless communication system according to an embodiment of the present disclosure.

In reference to FIG. 18, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs(Application Specific Integrated Circuit), one or more DSPs(Digital Signal Processor), one or more DSPDs (Digital Signal Processing Device), one or more PLDs(Programmable Logic Device) or one or more FPGAs(Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL(non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN(personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE- A, 5G system, but may be applied to various wireless communication systems other than the 3GPP LTE/LTE-A, 5G system.

The invention claimed is:

1. A method comprising:

receiving, by a terminal from a base station, configuration information regarding a plurality of reference signal (RS) resource set; and transmitting, by the terminal to the base station, reporting information including first measurement information for a first RS resource set and second measurement information for a second RS resource set, based on the configuration information, wherein the first measurement information is transmitted periodically, semi-persistently, or aperiodically, and an aperiodic first measurement information is triggered by the base station, wherein the second measurement information is transmitted aperiodically on a basis that a predetermined event is triggered by the terminal, and wherein the first measurement information and the second measurement information are L1 (layer 1) measurement information.

2. The method according to claim 1, wherein:

the configuration information includes at least one of whether event-based or non-event-based reporting is performed, a reporting period, a reporting offset, a number of RS resources to be reported, or the number of measurement information to be reported for each of the plurality of RS resource sets.

3. The method according to claim 1, wherein:

the configuration information includes information on an event trigger criteria, the criteria includes at least one of a relative comparison of quality values of a best RS resource between a specific RS resource set and other at least one RS resource set of the plurality of RS resource sets or a comparison with an absolute threshold for the quality value of the best RS resource of the specific RS resource set, or the criteria includes at least one of the relative comparison of quality values of the best RS resource between the specific RS resource set and other at least one RS resource set of the plurality of RS resource sets or a comparison with an absolute threshold for the quality value of the best RS resource of the specific RS resource set.

4. The method according to claim 1, wherein:

the reporting information includes at least one of information on a RS resource set that at least one of the first measurement information or the second measurement information is associated respectively, or information on whether an event occurs.

5. The method according to claim 1, wherein:

the first measurement information and the second measurement information are transmitted on a same uplink resource or a different uplink resource.

6. The method according to claim 5, wherein:

the first measurement information and the second measurement information are multi-part-encoded and transmitted on the same uplink resource, a first part includes the first measurement information and further includes at least one of whether the second measurement information exists or part of the second measurement information, a second part includes all of the second measurement information or a remaining part of the second measurement information, the second part is included in the reporting information on a basis that the second measurement information exists.

7. The method according to claim 5, wherein:

the same uplink resource is determined based on a predefined payload size based on an assumption that the second measurement information is included in the reporting information or the assumption that the second measurement information is not included.

8. The method according to claim 5, wherein:

the different uplink resource includes a first resource reserved for the first measurement information and a second resource reserved for the second measurement information.

9. The method according to claim 5, wherein:

on a basis that a calculated payload size of entire information including at least one of the first measurement information or the second measurement information is larger than a maximum payload size of the same or different resource, part of at least one of the first measurement information or the second measurement information is omitted.

10. The method according to claim 1, wherein:

a reporting time when transmission of the second measurement information is allowed or the reporting time when transmission of the second measurement information is not allowed is preconfigured or predefined.

11. The method according to claim 1, wherein:

each of the plurality of RS resource sets includes at least one RS resource associated with a same entity identifier or a same scrambling identifier, the entity corresponds to at least one of a cell, a transmission and reception point (TRP), a panel, or a beam.

12. The method according to claim 11, wherein:

the first RS resource set is associated with a serving entity and the second RS resource set is associated with a neighboring entity.

13. The method according to claim 1, wherein:

the RS resource includes at least one of a channel state information-reference signal (CSI-RS) resource or a synchronization signal (SS)/physical broadcast channel (PBCH) block, the L1 measurement information includes at least one of reference signal received power (L1-RSRP), a signal to interference and noise ratio (L1-SINR), or reference signal received quality (L1-RSRQ).

14. The method according to claim 1, wherein:

the reporting information includes at least one of uplink control information (UCI), or a medium access control (MAC)-control element (CE), the reporting information is transmitted through at least one of a physical uplink control channel (PUCCH) or a physical uplink shared channel (PUSCH), the PUSCH is transmitted based on grant-based or configured grant.

15. The method according to claim 14, wherein:

whether an event occurs is reported through the PUCCH and the second measurement information is reported through the PUSCH.

16. A terminal comprising:

at least one transceiver; and at least one processor connected to the at least one transceiver, wherein the at least one processor is configured to:

receive, through the at least one transceiver, from a base station, configuration information regarding a plurality of reference signal (RS) resource sets; and transmit, through the at least one transceiver, to the base station, reporting information including first measurement information for a first RS resource set and second measurement information for a second RS resource set based on the configuration information, wherein the first measurement information is transmitted periodically, semi-persistently or aperiodically, and an aperiodic first measurement information is triggered by the base station, wherein the second measurement information is transmitted aperiodically on a basis that a predetermined event is triggered by the terminal, and wherein the first measurement information and the second measurement information are L1 (layer 1) measurement information.

17. A base station comprising:

at least one transceiver; and at least one processor connected to the at least one transceiver, wherein the at least one processor is configured to:

transmit, through the at least one transceiver, to a terminal, configuration information regarding a plurality of reference signal (RS) resource sets; and receive, through the at least one transceiver, from the terminal, reporting information including first measurement information for a first RS resource set and second measurement information for a second RS resource set transmitted based on the configuration information, wherein the first measurement information is transmitted periodically, semi-persistently or aperiodically, and an aperiodic first measurement information is triggered by the base station, wherein the second measurement information is transmitted aperiodically on a basis that a predetermined event is triggered by the terminal, and wherein the first measurement information and the second measurement information are L1 (layer 1) measurement information.

* * * * *